(12) United States Patent
Miyazaki et al.

(10) Patent No.: US 11,796,319 B2
(45) Date of Patent: Oct. 24, 2023

(54) SENSOR AND ELECTRONIC DEVICE

(71) Applicant: KABUSHIKI KAISHA TOSHIBA, Tokyo (JP)

(72) Inventors: Fumito Miyazaki, Yokohama Kanagawa (JP); Yasushi Tomizawa, Tokyo (JP); Ryunosuke Gando, Yokohama Kanagawa (JP); Hiroki Hiraga, Saitama Saitama (JP); Kei Masunishi, Kawasaki Kanagawa (JP); Shiori Kaji, Kawasaki Kanagawa (JP); Daiki Ono, Yokohama Kanagawa (JP); Etsuji Ogawa, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 17/650,749

(22) Filed: Feb. 11, 2022

(65) Prior Publication Data
US 2022/0326013 A1 Oct. 13, 2022

(30) Foreign Application Priority Data
Apr. 13, 2021 (JP) .................................. 2021-067538

(51) Int. Cl.
*G01C 19/5712* (2012.01)
(52) U.S. Cl.
CPC ................................ *G01C 19/5712* (2013.01)
(58) Field of Classification Search
CPC . G01C 19/5712; G01C 19/5776; G01C 19/56
See application file for complete search history.

(56) References Cited

U.S. PATENT DOCUMENTS 9,417,067 B1* 8/2016 Liu ....................... G01C 25/005
2004/0206176 A1* 10/2004 Willig ................ G01C 19/5747
73/504.12

(Continued)

FOREIGN PATENT DOCUMENTS

JP 2020-169619 A 10/2020
JP 2020-187018 A 11/2020

OTHER PUBLICATIONS

D.D. Lynch, "Vibratory Gyro Analysis by the Method of Averaging" in Proc. 2nd St. Petersburg Conf. on Gyroscopic Tech. and Navigation, pp. 18-26 (1995).

*Primary Examiner* — David J Bolduc
(74) *Attorney, Agent, or Firm* — Finnegan, Henderson, Farabow, Garrett & Dunner, LLP

(57) ABSTRACT

According to one embodiment, a sensor includes a base body including a first surface including first and second base body regions, a first structure body provided in the first base body region, a second structure body provided in the second base body region, and a control device. The first structure body includes a first movable member configured to vibrate. The vibration of the first movable member includes first and second components. The second structure body includes a second movable member configured to vibrate. The control device includes a controller configured to perform a processing operation. The processing operation includes outputting a second rotation angle, The second rotation angle is obtained by correcting a first rotation angle based on a resonance frequency of the second movable member. The first rotation angle of the first movable member is obtained based on the first component and the second component.

20 Claims, 13 Drawing Sheets

(56) References Cited

U.S. PATENT DOCUMENTS

| | | | |
|---|---|---|---|
| 2009/0158846 A1* | 6/2009 | Lignon | G01C 19/567 |
| | | | 73/504.12 |
| 2018/0209816 A1* | 7/2018 | Hodjat-Shamami | |
| | | | G01C 19/5684 |
| 2018/0245946 A1* | 8/2018 | Weinberg | G01C 19/5684 |
| 2020/0363205 A1 | 11/2020 | Gando et al. | |
| 2021/0381831 A1* | 12/2021 | Gando | G01C 19/5776 |

* cited by examiner

SENSOR AND ELECTRONIC DEVICE

CROSS-REFERENCE TO RELATED APPLICATIONS

This application is based upon and claims the benefit of priority from Japanese Patent Application No. 2021-067538, filed on Apr. 13, 2021; the entire contents of which are incorporated herein by reference.

FIELD

Embodiments described herein relate generally to a sensor and an electronic device.

BACKGROUND

There are sensors such as gyro sensors. It is desired to improve the detection accuracy of sensors and electronic devices.

DETAILED DESCRIPTION

Figure 1A:
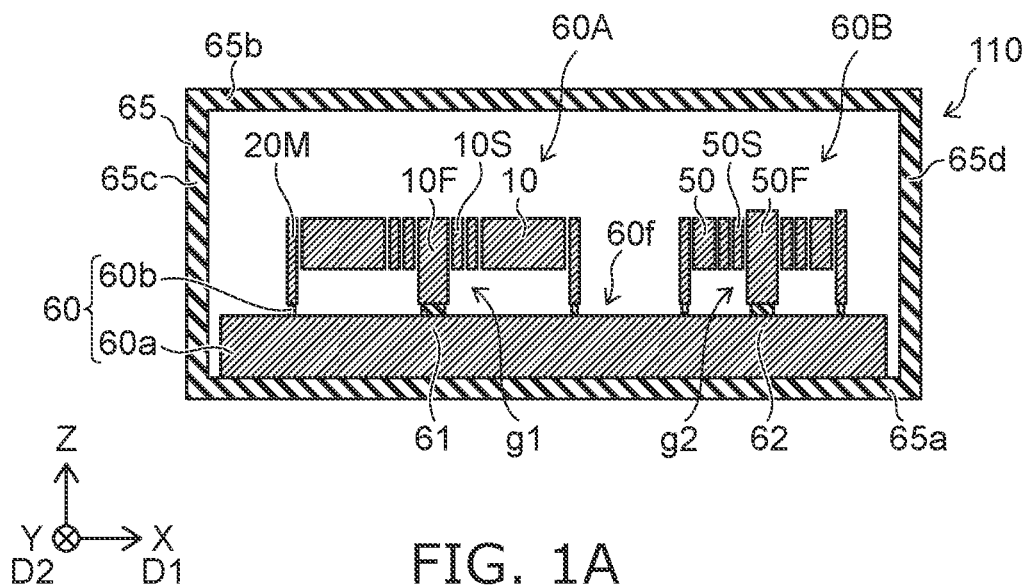
FIGS. 1A and 1B are schematic views illustrating a sensor according to a first embodiment.

According to one embodiment, a sensor includes a base body including a first surface including a first base body region and a second base body region, a first structure body provided in the first base body region, a second structure body provided in the second base body region, and a control device. The first structure body includes a first movable member configured to vibrate. The vibration of the first movable member includes a first component along a first direction along the first surface and a second component along a second direction along the first surface. The second direction crosses the first direction. The second structure body includes a second movable member configured to vibrate. The control device includes a controller configured to perform a processing operation. The processing operation includes outputting a second rotation angle. The second rotation angle is obtained by correcting a first rotation angle based on a resonance frequency of the second movable member. The first rotation angle of the first movable member is obtained based on the first component and the second component.

According to one embodiment, a sensor includes a first structure body provided in a first base body region including a first surface, a second structure body provided in a second base body region, a first housing, and a control device. The first structure body and the second structure body are provided in the first housing. The first structure body includes a first movable member configured to vibrate. The vibration of the first movable member includes a first component along a first direction along the first surface and a second component along a second direction along the first surface. The second direction crosses the first direction. The second structure body includes a second movable member configured to vibrate. The control device includes a controller configured to perform a processing operation. The processing operation includes outputting a second rotation angle. The second rotation angle is obtained by correcting a first rotation angle based on a resonance frequency of the second movable member. The first rotation angle of the first movable member is obtained based on the first component and the second component.

According to one embodiment, an electronic device includes the sensor described in any one of the above, and a circuit controller configured to control a circuit based on a signal obtained from the sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
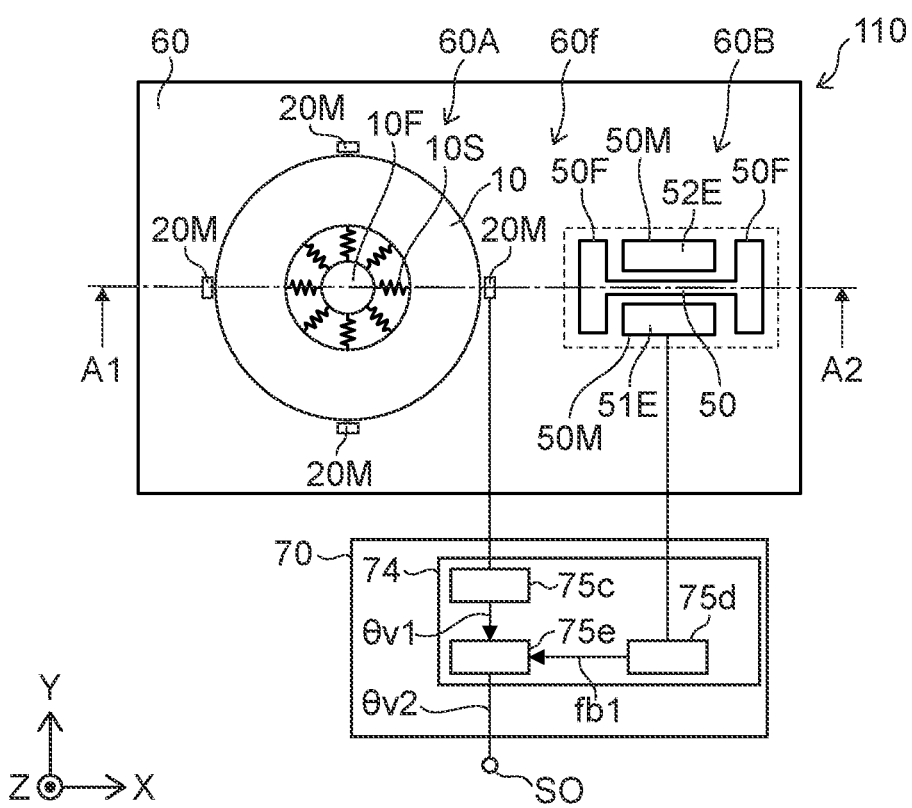

FIGS. 1A and 1B are schematic views illustrating a sensor according to a first embodiment.

FIG. 1A is a cross-sectional view taken along line A1-A2 of FIG. 1B. FIG. 1B is a plan view. As shown in FIGS. 1A and 1B, a sensor 110 according to the embodiment includes a base body 60, a first structure body 60A, a second structure body 60B, and a control device 70.

The sensor 110 may further include a first housing 65. For example, the first housing 65 includes first to fourth members 65a to 65d. A base body 60, a first structure body 60A, and a second structure body 60B are provided between the first member 65a and the second member 65b. The base body 60, the first structure body 60A, and the second structure body 60B are provided between the third member 65c and the fourth member 65d. The inside of the first housing 65 may be depressurized to less than 1 atm. The control device 70 may be provided inside or outside the first housing 65. The second to fourth members 65b to 65d may be continuous with each other. The first member 65a is, for example, a lid. In FIG. 1B, the first housing 65 is omitted.

The base body 60 includes a first surface 60f. The first surface 60f includes a first base body region 61 and a second base body region 62. The first surface 60f is, for example, an upper surface.

In this example, the base body 60 includes a substrate 60a and an insulating film 60b. The substrate 60a may be, for example, a semiconductor substrate. The substrate 60a may be, for example, a silicon substrate. The insulating film 60b includes, for example, silicon oxide. The insulating film 60b is provided on the substrate 60a. For example, the upper surface of the insulating film 60b corresponds to the first surface 60f.

The first structure body 60A is provided in the first base body region 61. The second structure body 60B is provided in the second base body region 62. The first structure body 60A is, for example, a sensor element. The first structure 60A is, for example, a "gyro element". The first structure body 60A is, for example, RIG (Rate Integrating Gyroscope).

The first structure body 60A includes a first movable member 10. The first movable member 10 is possible to vibrate. The vibration of the first movable member 10 includes a first component and a second component. The first component is a component along a first direction D1. The second component is a component along a second direction D2. The first direction D1 is along the first surface 60f. The second direction D2 crosses the first direction D1 and is along the first surface 60f.

The first surface 60f is taken as the X-Y plane. One direction in the X-Y plane is taken as the X-axis direction. The direction perpendicular to the X-axis direction along the X-Y plane is taken as the Y-axis direction. The direction perpendicular to the X-axis direction and the Y-axis direction is taken as the Z-axis direction. The first direction D1 is, for example, the X-axis direction. The second direction D2 is, for example, the Y-axis direction.

The second structure body 60B includes a second movable member 50. The second movable member 50 is possible to vibrate. The second movable member 50 has a resonance frequency fb1 (see FIG. 1B).

The control device 70 includes a controller 74. The controller 74 is possible to perform the following processing operation, The processing operation includes outputting a second rotation angle θv2 obtained by correcting a first rotation angle θv1 of the first movable member 10 based on a resonance frequency fb1 of the second movable member 50. The first rotation angle θv1 of the first movable member 10 is obtained based on the first component and the second component.

For example, the controller 74 detects the amplitude of the first component and the amplitude of the second component of the vibration of the first movable member 10. The ratio of these amplitudes corresponds to the first rotation angle θv1. The controller 74 includes a part for deriving the rotation angle of the first movable member 10 (for example, a rotation angle derivation part 75c). Data related to the derived first rotation angle θv1 is output from the rotation angle derivation part 75c.

The controller 74 includes a part for detecting the resonance frequency fb1 of the second movable member 50 (for example, the resonance frequency detection part 75d). The controller 74 includes, for example, an angle correction calculation part 75e. The resonance frequency detection part 75d supplies the resonance frequency fb1 to the angle correction calculation part 75e. The angle correction calculation part 75e corrects the first rotation angle θv1 based on the detected resonance frequency fb1. The angle correction calculation part 75e is possible to output the signal SO corresponding to the second rotation angle θv2 obtained by the correction.

For example, the rotation angle of the first movable member 10 (first rotation angle θv1) is obtained based on the vibration characteristics of the first movable member 10. The vibration characteristics of the first movable member 10 may change depending on the temperature. In the embodiment, the rotation angle (first rotation angle θv1) of the first movable member 10 is corrected based on the resonance frequency fb1 of the second movable member 50. As a result, the rotation angle can be detected with higher accuracy. According to the embodiment, it is possible to provide a sensor which can improve accuracy.

The controller 74 includes a computer. The controller 74 includes an electronic circuit. The controller 74 includes, for example, a processor. The rotation angle derivation part 75c, the resonance frequency detection part 75d, and the angle correction calculation part 75e included in the controller 74 may be, for example, a part of the processor. The rotation angle derivation part 75c, the resonance frequency detection part 75d, and the angle correction calculation part 75e may be functional block elements in the processor. The processing in each of the rotation angle derivation part 75c, the resonance frequency detection part 75d, and the angle correction calculation part 75e may be performed by one or multiple processors.

In the embodiment, the second base body region 62 may be continuous with the first base body region 61. By providing the first structure body 60A and the second structure body 60B on one base body 60, the temperatures of these structure bodies tend to be substantially the same. Since the temperature characteristics of these structure bodies are the same, more accurate temperature correction can be performed. Higher accuracy can be obtained.

In the embodiment, for example, the base body 60, the first structure body 60A, and the second structure body 60B are provided in the first housing 65. As a result, the temperature of the first structure body 60A tends to be substantially the same as the temperature of the second structure body 60B. Highly accurate temperature correction is possible. By reducing the pressure inside the first housing 65, for example, the influence of changes in the external temperature can be suppressed. Higher accuracy can be obtained.

As shown in FIGS. 1A and 1B, the first structure body 60A includes a first fixing portion 10F and a first connecting portion 10S. The first fixing portion 10F is fixed to the first base body region 61. The first connecting portion 10S is supported by the first fixing portion 10F. The first connecting portion 10S is connected to the first movable member 10. In this example, in the X-Y plane, the first movable member 10 is provided around the first fixing portion 10F. The first movable member 10 is annular. The first movable member 10 is supported by the multiple first connecting portions 10S. A gap g1 is provided between the first movable member 10 and the base body 60. The first connecting portion 10S has, for example, a bent shape. The first connecting portion 10S may have, for example, a meander shape. The first connecting portion 10S is, for example, a spring structure body. The first connecting portion 10S is deformable.

The second structure body 60B includes a second fixing portion 50F. The second fixing portion 50F is fixed to the second base body region 62. The second fixing portion 50F supports the second movable member 50. A gap g2 is provided between the second movable member 50 and the second base body region 62.

In the embodiment, for example, the second movable member 50 preferably includes the same material as that included in the first connecting portion 10S. As a result, the temperature characteristics of the second movable member 50 and the first connecting portion 10S become substantially the same as each other. For example, the second movable member 50 and the first connecting portion 10S include silicon, For example, the second movable member 50 and the first connecting portion 10S may include impurities (for example, at least one selected from the group consisting of boron, phosphorus and arsenic) in addition to silicon. The material of the first connecting portion 10S may be substantially the same as the material of the first movable member 10.

In the embodiment, for example, it is preferable that the rate of change of the elastic modulus of the second movable member 50 with respect to temperature is substantially the same as the rate of change of the elastic modulus of the first connecting portion 10S with respect to temperature. For example, the rate of change of the elastic modulus of the second movable member 50 with respect to temperature is not less than 0.99 times and not more than 1.01 times of the rate of change of the elastic modulus of the first connecting portion 10S with respect to temperature. The elastic modulus may be, for example, Young's modulus (for example, longitudinal elastic modulus).

The first movable member 10 and the first connecting portion 10S are, for example, conductive. The second movable member 50 may be conductive.

As shown in FIG. 1B, in this example, multiple second fixing portions 50F are provided. The second movable member 50 is provided between the multiple second fixed portions 50F. For example, the second structure body 60B includes a second counter electrode member 50M. In this example, multiple second counter electrode members 50M are provided. The vibration of the second movable member 50 may be controlled by these multiple second counter electrode members 50M. The vibration of the second movable member 50 may be controlled by a voltage applied to the second counter electrode members 50M.

In this example, the second counter electrode member 50M includes an electrode 51E and an electrode 52E. Between the electrode 51E and the electrode 52E, at least a portion of the second movable member 50 is provided. In this example, the direction from the electrode 52E toward the electrode 51E is along the Y-axis direction. The second movable member 50 is along the X-axis direction. For example, the second movable member 50 is vibrated by a voltage applied between the electrode 51E and the second movable member 50 (e.g., a voltage including an AC component), This voltage may be supplied from the control device 70. For example, the electrical signal generated between the electrode 52E and the second movable member 50 is detected by the electrodes 52E. The resonance frequency fb1 of the second movable member 50 may be detected by this electrical signal.

As described above, the second structure body 60B may include the multiple second counter electrode members 50M. The multiple second counter electrode members 50M correspond to, for example, the electrodes 51E and 52E. At least a portion of the second movable member 50 is between the multiple second counter electrode members 50M. In this example, the multiple second fixing portions 50F are provided. The direction from one of the multiple second fixing portions 50F toward another one of the multiple second fixing portions 50F crosses the direction from one of the multiple second counter electrode members 50M (for example, the electrode 51E) toward another one of the multiple second counter electrodes 50M (for example, the electrode 52E). The direction from the electrode 51E toward the electrode 52E and the extending direction of the second movable member 50 are arbitrary.

The base body 60 may rotate about a third direction (for example, the Z-axis direction) that crosses the first surface 60f. The resonance frequency fb1 of the second movable member 50 does not change with respect to the rotation of the base body 60. Alternatively, the rate of change of the resonance frequency fb1 of the second movable member 50 with respect to the rotation of the base body 60 about the third direction is not more than the rate of change of the resonance frequency fb1 of the second movable member 50 with respect to the displacement of the base body 60 along the third direction, By correcting the first rotation angle θv1 using the resonance frequency fb1 of the second movable member 50 having such characteristics, higher accuracy detection becomes possible.

As shown in FIGS. 1A and 1B, for example, the first structure body 60A includes a first counter electrode member 20M. In this example, multiple first counter electrode members 20M are provided. The vibration of the first movable member 10 may be controlled by these multiple first counter electrode members 20M. The vibration of the first movable member 10 may be controlled by a voltage applied to the first counter electrode members 20M (for example, a voltage including an AC component). The voltage is applied between, for example, the first counter electrode member 20M and the first movable member 10.

Figure 2A:
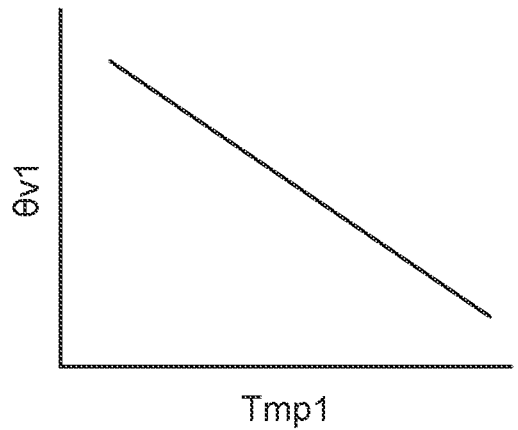
FIGS. 2A to 2D are schematic views illustrating characteristics of the sensor according to the first embodiment.
Figure 2B:
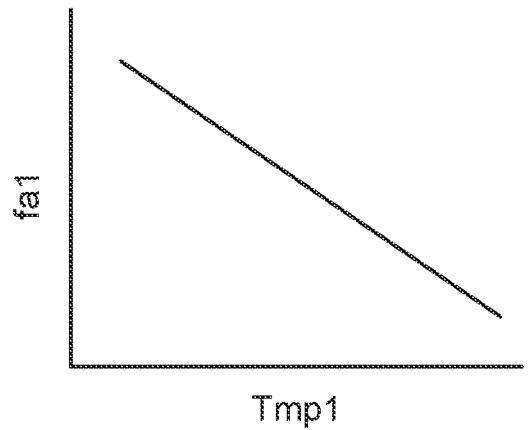
Figure 2C:
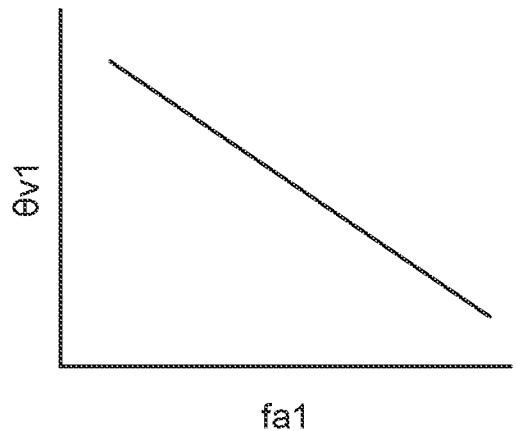

FIGS. 2A to 2C are schematic views illustrating characteristics of the sensor according to the first embodiment.

The horizontal axis in FIG. 2A is a temperature Tmp1 of the first structure body 60A. The temperature Tmp1 corresponds to the temperature of the first movable member 10 and the first connecting portion 10S. The vertical axis of FIG. 2A is the first rotation angle θv1 obtained with respect to the first movable member 10. As shown in FIG. 2A, when the temperature Tmp1 changes, the first rotation angle θv1 changes. The horizontal axis of FIG. 2B is the temperature Tmp1 of the first structure body 60A. The vertical axis of FIG. 2B is a resonance frequency fa1 of the first movable member 10. As shown in FIG. 2B, when the temperature Tmp1 changes, the resonance frequency fa1 changes. It is considered that this is because the characteristics (for example, elastic modulus) of the first connecting portion 10S change according to the change in the temperature Tmp1.

The horizontal axis of FIG. 2C is the resonance frequency fa1 of the first structure body 60A. The vertical axis of FIG. 2C is the first rotation angle θv1. As shown in FIG. 2C, when the resonance frequency fat changes, the first rotation angle θv1 changes. It is considered that this is because the characteristics (for example, elastic modulus) of the first connecting portion 10S change due to the change in the temperature Tmp1, and the vibration characteristics of the first movable member 10 change accordingly.

Figure 2D:
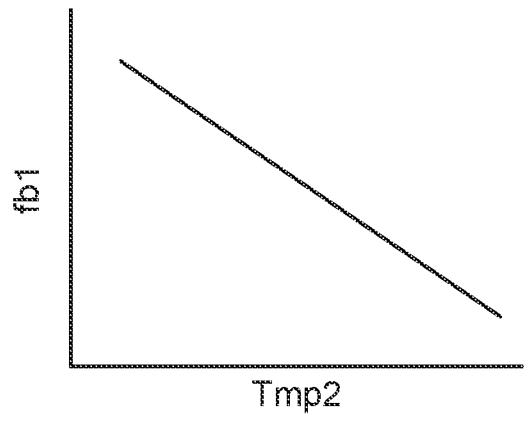

The horizontal axis of FIG. 2D is a temperature Tmp2 of the second structure body 60B. The temperature Tmp2 corresponds to the temperature of the second movable member 50. The vertical axis of FIG. 2D is the resonance frequency fb1 of the second movable member 50. As shown in FIG. 2D, when the temperature Tmp2 changes, the resonance frequency fb1 changes. It is considered that this is because the characteristics (for example, elastic modulus) of the second movable member 50 change according to the change in the temperature Tmp2.

In the embodiment, the first rotation angle θv1 is corrected based on the resonance frequency fb1. As a result, a rotation angle with higher accuracy can be obtained. The shift caused by the temperature change of the first rotation angle θv1 is corrected by using the resonance frequency fb1 of the second movable member 50. For example, the temperature may change over time. Even in such a case, a highly accurate rotation angle can be stably obtained.

In the embodiment, the ratio of the absolute value of the difference between the temperature of the second structure body 60B and the temperature of the first structure body 60A to the temperature of the first structure body 60A is not more than 0.05. Since the temperatures of both are substantially the same, more accurate correction becomes possible.

As will be described later, when the rotation angle of the first movable member 10 (first rotation angle θv1) is acquired, the vibration may be controlled based on the time constant or resonance frequency of the vibration of the first movable member 10, As a result, the first rotation angle θv1 can be obtained with higher accuracy.

Hereinafter, an example of the first structure body 60A will be described.

Figure 3:
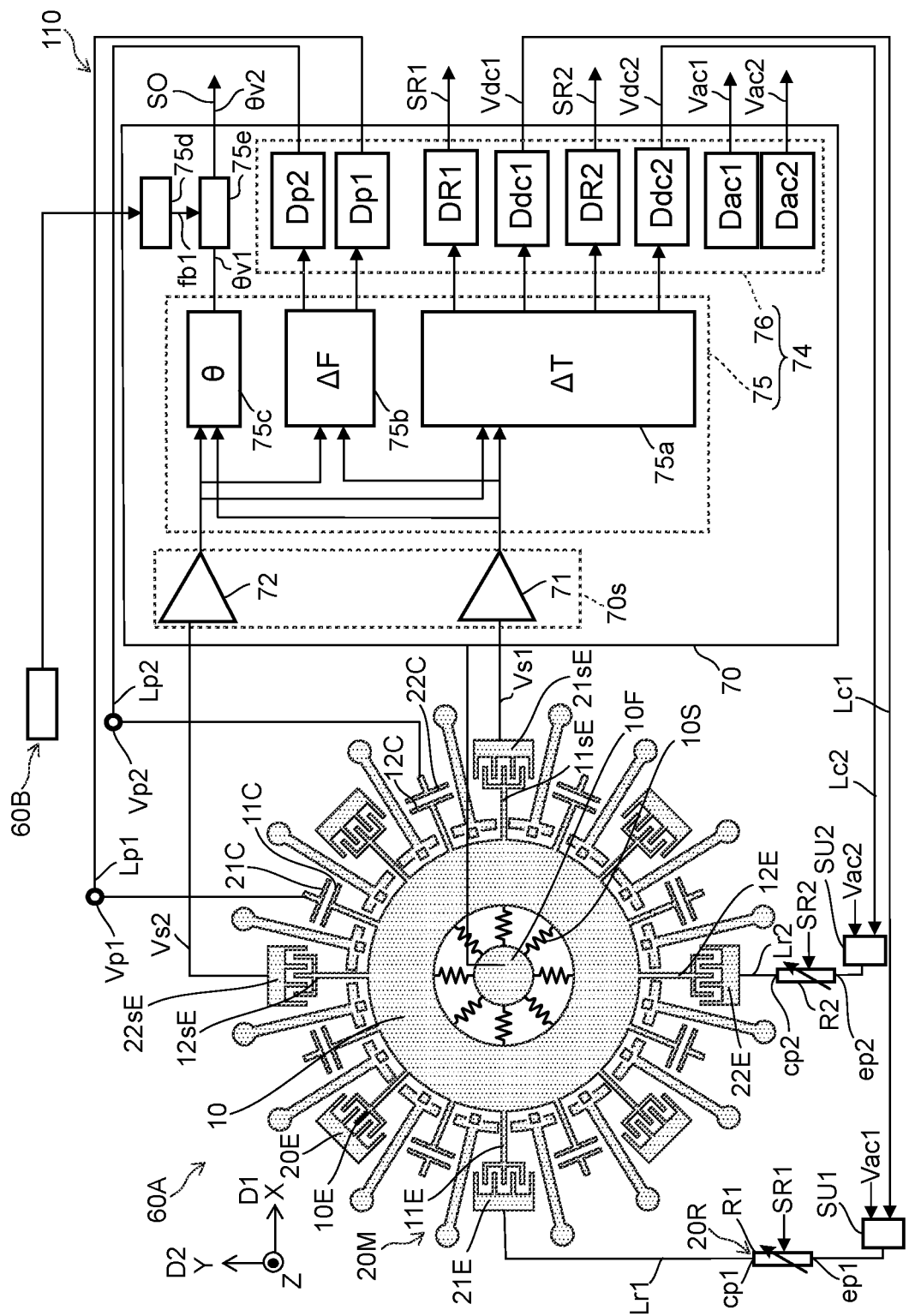
FIG. 3 is a schematic view illustrating the sensor according to the first embodiment.

FIG. 3 is a schematic view illustrating the sensor according to the first embodiment.

As shown in FIG. 3, for example, the first structure body 60A includes the first counter electrode member 20M and a resistor member 20R. The first counter electrode member 20M faces the first movable member 10. As the first counter electrode member 20M, for example, a first counter electrode 21E and a second counter electrode 22E are provided. The resistor member 20R is electrically connected to the first counter electrode member 20M. In this example, as the resistor member 20R, a first resistor R1 and a second resistor R2 are provided.

The controller 74 is possible to perform the following first operation, The first operation includes, for example, a first acquisition operation and a first change operation. In the first acquisition operation, the controller 74 acquires the first component and the second component of the vibration of the first movable member 10. For example, the amplitude of the first component of vibration and the amplitude of the second component of vibration are acquired.

In the first change operation, the controller 74 changes at least one of the values of the resistance of the resistor member 20R or the voltage applied to the resistor member 20R in order to reduce at least one of the first absolute value of the difference (first difference ΔT) between the acquired first time constant T1 of the first component and the acquired second time constant T2 of the second component, or the second absolute value of the difference (second difference ΔF) between the acquired first resonance frequency fr1 of the first component and the acquired second resonance frequency fr2 of the second component. The resistance of the resistor member 20R includes at least one of a resistance of the first resistor R1 or a resistance of the second resistor R2. The voltage includes at least one of a voltage applied to the end portion of the first resistor R1 or a voltage applied to the end portion of the second resistor R2.

By controlling the difference in time constant and resonance frequency between the first component along the first direction D1 and the second component along the second direction D2 to be small, the first rotation angle θv1 of the first movable member 10 can be detected with higher accuracy.

Hereinafter, an example of the first change operation will be described.

As shown in FIG. 3, the first movable member 10 includes multiple electrodes 10E. One of the multiple electrodes 10E corresponds to the first electrode 11E, Another one of the multiple electrodes 10E corresponds to the second electrode 12E.

The first structure 60A includes multiple counter electrodes 20E. The multiple counter electrode members 20E are included in the first counter electrode member 20M. One of the multiple counter electrodes 20E corresponds to the first counter electrode 21E. Another one of the multiple counter electrodes 20E corresponds to the second counter electrode 22E.

As shown in FIG. 3, in the first structure body 60A, the first movable member 10 is supported by the first connecting portion 10S. Since the first connecting portion 10S is deformable, the position of the first movable member 10 is possible to be changed. The change in the position of the first movable member 10 includes, for example, a change in the position in the X-Y plane. The change in position corresponds to the vibration of the first movable member 10. The vibration includes a change in position in the X-Y plane. The first structure body 60A is, for example, a MEMS (micro electro mechanical systems) element.

The first fixing portion 10F is provided at the central portion of the first movable member 10 in the X-Y plane. The direction from the first electrode 11E toward the first fixing portion 10F crosses the direction from the second electrode 12E toward the first fixing portion 10F. The direction from the first electrode 11E toward the central portion of the first movable member 10 in the X-Y plane crosses the direction from the second electrode 12E toward the central portion of the first movable member 10 in the X-Y plane.

The first counter electrode 21E faces the first electrode 11E. The second counter electrode 22E faces the second electrode 12E. One of the multiple counter electrodes 20E faces one of the multiple electrodes 10E. Facing directions include components along the X-Y plane.

In this example, the group including one of the multiple counter electrodes 20E and one of the multiple electrodes 10E is in the shape of a comb tooth electrode.

The first resistor R1 includes a first end portion ep1 and a first other end portion cp1. The first other end portion cp1 is electrically connected to the first counter electrode 21E. For example, the first end portion ep1 is electrically connected to the control device 70. In this example, the first other end portion cp1 is electrically connected to the first counter electrode 21E by the wiring Lr1.

In this example, a first adder SU1 is provided, One end of the wiring Lc1 is connected to one of multiple inputs of the first adder SU1. The other end of the wiring Lc1 is connected to the control device 70. A first AC voltage Vac1 (AC signal), which will be described later; is supplied to another one of the multiple inputs of the first adder SU1. The first end portion ep1 is electrically connected to the control device 70 via the first adder SU1 and the wiring Lc1.

The second resistor R2 includes a second end portion ep2 and a second other end portion cp2. The second other end portion cp2 is electrically connected to the second counter electrode 22E. For example, the second end portion ep2 is electrically connected to the control device 70. In this example, the second other end portion cp2 is electrically connected to the second counter electrode 22E by the wiring Lr2.

In this example, a second adder SU2 is provided. One end of the wiring Lc2 is connected to one of multiple inputs of the second adder SU2. The other end of the wiring Lc2 is connected to the control device 70. A second AC voltage Vac2 (AC signal), which will be described later, is supplied to another one of the multiple inputs of the second adder SU2. The second end portion ep2 is electrically connected to the control device 70 via the second adder SU2 and the wiring Lc2.

At least one of the first resistor R1 or the second resistor R2 is a variable resistor. In this example, both the first resistor R1 and the second resistor R2 are variable resistors, The resistance of the first resistor R1 changes according to a control signal SR1 supplied to the first resistor R1. The resistance of the second resistor R2 changes according to a control signal SR2 supplied to the second resistor R2.

For example, an integrated circuit may be used as the first resistor R1 and the second resistor R2. The first resistor R1 and the second resistor R2 may be formed on, for example, the base body 60 on which the first fixing portion 10F is fixed.

The control device 70 includes the controller 74. The controller 74 includes, for example, a calculation part 75 and a driver part 76. For example, the calculation result in the calculation part 75 is supplied to the driver part 76, The driver part 76 outputs various voltages and the like based on the calculation result. Various voltages include electrical signals.

In this example, the driver part 76 includes a control signal output part DR1, a control signal output part DR2, a voltage output part Ddc1, and a voltage output part Ddc2. The controller 74 (for example, the control signal output part DR1) supplies the control signal SR1 to the first resistor R1. The controller 74 (for example, the control signal output part DR2) supplies the control signal SR2 to the second resistor R2. The controller 74 (for example, the voltage output part Ddc1) controls a first voltage Vdc1 of the first end portion ep1 of the first resistor R1. The controller 74 (for example, the voltage output part Ddc2) controls a second voltage Vdc2 of the second end portion ep2 of the second resistor R2. The first voltage Vdc1 and the second voltage Vdc2 include a DC component, For example, a capacitance element is formed by the first electrode 11E and the first counter electrode 21E. The first resistor R1 is connected in series to the capacitive element. For example, a first variable electric damper is formed by the first electrode 11E, the first counter electrode 21E, and the first resistor R1. For example, the capacitance of the capacitive element by the first electrode 11E and the first counter electrode 21E may be changed by the first voltage Vdc1. For example, the first variable electric damper is formed by the first electrode 11E, the first counter electrode 21E, the first resistor R1, and the first voltage Vdc1.

For example, a capacitance element is formed by the second electrode 12E and the second counter electrode 22E. The second resistor R2 is connected in series to the capacitive element. For example, a second variable electric damper is formed by the second electrode 12E, the second counter electrode 22E, and the second resistor R2, For example, the capacitance of the capacitive element by the second electrode 12E and the second counter electrode 22E may be changed by the second voltage Vdc2, For example, the second variable electric damper is formed by the second electrode 12E, the second counter electrode 22E, the second resistor R2, and the second voltage Vdc2.

With these variable electric dampers, the vibration characteristics of the first movable member 10 can be changed.

As described above, the direction from the first electrode 11E toward the central portion of the first movable member 10 in the X-Y plane crosses the direction from the second electrode 12E toward the central portion of the first movable member 10 in the X-Y plane. For example, the direction of displacement of the first movable member 10 when the first voltage Vdc1 changes crosses the direction of displacement of the first movable member 10 when the second voltage Vdc2 changes. For example, when the first voltage Vdc1 changes, the position of the first movable member 10 changes along one of the X-axis direction and the Y-axis direction. For example, when the second voltage Vdc2 changes, the position of the first movable member 10 changes along the other of the X-axis direction and the Y-axis direction.

With the first variable electric damper and the second variable electric damper as described above, the time constant of the component in the X-axis direction of vibration and the time constant of the component in the Y-axis direction of vibration can be controlled. By controlling the time constant, it is possible to provide a sensor that can improve the accuracy. An example of controlling the time constant will be described later.

As described above, in this example, the first AC voltage Vac1 is input to the first adder SU1, and the second AC voltage Vac2 is input to the second adder SU2. For example, the driver part 76 of the controller 74 is provided with an AC voltage output part Dac1 and an AC voltage output part Dac2.

The first AC voltage Vac1 is output from the AC voltage output part Dac1. The first AC voltage Vac1 is applied to the first end portion ep1 of the first resistor R1 via the first adder SU1. The first AC voltage Vac1 is applied to the first counter electrode 21E via the first resistor R1. An AC component of the first AC voltage Vac1 is applied between the first counter electrode 21E and the first electrode 11E. As a result, the first movable member 10 vibrates in, for example, one direction according to the first AC voltage Vac1. The direction of this vibration includes, for example, a component in the first direction D1.

The second AC voltage Vac2 is output from the AC voltage output part Dac2. The second AC voltage Vac2 is applied to the second end portion ep2 of the second resistor R2 via the second adder SU2. The second AC voltage Vac2 is applied to the second counter electrode 22E via the second resistor R2. An AC component of the second AC voltage Vac2 is applied between the second counter electrode 22E and the second electrode 12E. As a result, the first movable member 10 vibrates along, for example, another one direction according to the second AC voltage Vac2. The direction of this vibration includes, for example, a component in the second direction D2.

In this way, the controller 74 applies the first AC voltage Vac1 between the first electrode 11E and the first counter electrode 21E, and applies the second AC voltage Vac2 between the second electrode 12E and the second counter electrode 22E, to vibrate the first movable member 10. The vibration direction of the first movable member 10 includes a component in the first direction D1 and a component in the second direction D2.

When the vibrating first movable member 10 rotates due to an external force or the like, the vibrating state changes. The rotation angle $\theta$ can be detected by detecting the change in the vibration state. For example, the controller 74 is possible to vibrate the first movable member 10 along the axial direction. For example, the controller 74 is possible to rotate its axial direction.

As shown in FIG. 3, in this example, the first movable member 10 includes a first detection electrode 11sE and a second detection electrode 12sE. For example, the direction from the first electrode 11E toward the first detection electrode 11sE (in this example, the X-axis direction) crosses the direction from the second electrode 12E toward the second detection electrode 12sE (in this example, the Y-axis direction).

On the other hand, the first structure body 60A (sensor element) includes a first detection counter electrode 21sE and a second detection counter electrode 22sE. The first detection counter electrode 21sE faces the first detection electrode 11sE. The second detection counter electrode 22sE faces the second detection electrode 12sE. The first detection counter electrode 21sE and the first detection electrode 11sE have, for example, a comb tooth electrode shape. The second detection counter electrode 22sE and the second detection electrode 12sE have, for example, a comb tooth electrode shape.

The control device 70 includes a first detection part 71 and a second detection part 72. The first detection part 71 is electrically connected to the first detection counter electrode 21sE. The second detection part 72 is electrically connected to the second detection counter electrode 22sE. The first detection part 71 and the second detection part 72 are included in the detection part 70s. For example, by using a differential circuit or the like, the operation of the first detection part 71 and the second detection part 72 may be performed by one detection part. In the following, for the sake of simplicity, an example in which two detection parts are provided will be described.

The first detection part 71 applies a first detection voltage Vs1 to the first detection counter electrode 21sE, for example. Due to the capacitive coupling between the first detection counter electrode 21sE and the first detection electrode 11sE, a signal corresponding to the amplitude of vibration along the first direction D1 is detected. The second detection part 72 applies a second detection voltage Vs2 to the second detection counter electrode 22sE, for example. Due to the capacitive coupling between the second detection counter electrode 22sE and the second detection electrode 12sE, a signal corresponding to the amplitude of vibration along the second direction D2 is detected.

The first detection part 71 detects the first amplitude. The first amplitude is an amplitude of the first component of the vibration of the first movable member 10 along the first direction D1. The second detection part 72 detects the second amplitude. The second amplitude is an amplitude of the second component along the second direction D2 of the vibration of the first movable member 10.

The amplitudes detected by the first detection part 71 and the second detection part 72 are supplied to the calculation part 75 of the control part 74. The calculation part 75 includes, for example, a portion for deriving the rotation angle θ (for example, the rotation angle derivation part 75c). The data regarding the rotation angle θ (first rotation angle θv1) derived by the rotation angle derivation part 75c is output as a signal from the control device 70 (for example, the controller 74).

The controller 74 is possible to output a signal corresponding to the first rotation angle θv1 of the first movable member 10 based on the first component along the first direction D1 of the vibration and the second component along the second direction D2 of the vibration.

As described above, when the vibrating first movable member 10 rotates due to an external force or the like, the vibrating state changes. The change in the vibration state is considered to be due to, for example, the action of the Coriolis force. For example, the first movable member 10 vibrates by a spring mechanism (for example, the first connecting portion 10S). The Coriolis force due to the angle velocity Ω of rotation acts on the first movable member 10 vibrating in the first direction D1. As a result, a component of vibration along the second direction D2 is generated in the first movable member 10. The second detection part 72 detects the amplitude of vibration along the second direction D2, On the other hand, the Coriolis force due to the angle velocity Ω of rotation acts on the first movable member 10 vibrating in the second direction D2. As a result, a component of vibration along the first direction D1 is generated in the first movable member 10. The first detection part 71 detects the amplitude of vibration along the first direction D1. For example, the amplitude of the first component in the first direction D1 is taken as "Ax", and the amplitude of the second component in the second direction D2 is taken as "Ay", The rotation angle θ (first rotation angle θv1) corresponds to, for example, $\tan^{-1}(-Ay/Ax)$.

The controller 74 acquires the first component from the first detection part 71 and the second component from the second detection part 72. The signal corresponding to the first rotation angle θv1 is obtained by the calculation in the controller 74.

Here, for example, it is considered that when the first movable member 10 does not rotate, the rotation angle θ calculated in the case where the first component in the first direction D1 and the second component in the second direction D2 are substantially the same is obtained with high accuracy. However, the amplitude of vibration along the two directions may not always be uniform, for example, due to variations in the manufacturing process. Further, the amplitude of vibration may become non-uniform due to a temperature change or the like. In such a case, it is considered that the detection accuracy may be lowered.

In the embodiment, for example, the controller 74 of the control device 70 performs the first operation. The first operation is, for example, a correction operation, By the first operation, for example, the vibration of the first movable member 10 tends to be uniform in the X-Y plane. It is possible to provide a sensor that can improve accuracy. At least a portion of the first operation is performed, for example, by one portion (time constant adjustment part 75a) of the calculation part 75 of the controller 74.

In the first acquisition operation, the controller 74 acquires the first component (amplitude) along the first direction D1 of the vibration of the first movable member 10 and the second component (amplitude) along the second direction D2 of the vibration of the first movable member 10.

In the first change operation, the controller 74 changes at least one of the values of the resistance or the voltage in order to reduce at least one of the first absolute value of the difference (first difference ΔT) between the acquired first time constant T1 of the first component and the acquired second time constant T2 of the second component, or the second absolute value of the difference (second difference ΔF) between the acquired first resonance frequency fr1 of the first component and the acquired second resonance frequency fr2 of the second component. In one example, the controller 74 changes at least one of the resistance value of the first resistor R1, the resistance value of the second resistor R2, the first voltage Vdc1 of the first end portion ep1, or the second voltage Vdc2 of the second end portion ep2 so as to reduce the absolute value of the difference of the time constant (first difference ΔT).

The first change operation reduces the absolute value of the difference of the time constant (first difference ΔT). As a result, the non-uniformity of the vibration of the first movable member 10 in the X-Y plane is suppressed, This makes it possible to provide a sensor which can improve accuracy.

For example, after the first change operation, for example, the first difference ΔT may be compared with a defined threshold. When the first difference ΔT is less than the threshold value, the process ends. When the first difference ΔT is not less than the threshold value, the first acquisition operation and the first change operation may be repeated. The controller 74 may repeat the first operation. For example, the first operation may be an always automatic operation by a closed loop.

For example, the first component with respect to the first direction D1 of the vibration of the first movable member 10 has a first resonance frequency and a first time constant T1 (first attenuation time constant). The first time constant T1 is the time until the vibration intensity Ap1 becomes 1/e of the intensity Ap1 in the state before attenuation. "e" is the bottom of the natural logarithm.

For example, the second component with respect to the second direction D2 of the vibration of the first movable member 10 has a second resonance frequency and a second time constant T2 (second attenuation time constant). The second time constant T2 is the time until the vibration intensity Ap2 becomes 1/e of the intensity Ap2 in the state before attenuation.

The first time constant T1 can be changed, for example, by the value of the first resistor R1 or the first voltage Vdc1. It can be changed by the second time constant T2, for example, the value of the second resistor R2 or the second voltage Vdc2, In the embodiment, at least one of the resistance value of the first resistor R1, the resistance value of the second resistor R2, the first voltage Vdc1 of the first end portion ep1, or the second voltage Vdc2 of the second end portion ep2 is changed. As a result, the first difference ΔT is reduced. As a result, the non-uniformity of the vibration in the first direction D1 and the second direction D2 can be suppressed. According to the embodiment, the accuracy of detection can be improved.

For example, the time constant adjustment part 75a illustrated in FIG. 3 is supplied with the first component detected by the first detection part 71 and the second component detected by the second detection part 72. The time constant adjustment part 75a calculates a value such that the first difference ΔT becomes smaller with respect to at least one of the first resistor R1, the second resistor R2, the first voltage Vdc1, or the second voltage Vdc2. The calculation result is supplied to the driver part 76. Based on the calculated value, the driver part 76 outputs the control signal SR1 of the first resistor R1, the control signal SR2 of the second resistor R2, the first voltage Vdc1, and the second voltage Vdc2. At least one of the control signal SR1, the control signal SR2, the first voltage Vdc1, or the second voltage Vdc2 is changed based on the value calculated so that the first difference ΔT becomes small.

On the other hand, the first component has a first resonance frequency fr1 and the second component has a second resonance frequency fr2. The first resonance frequency fr1 and the second resonance frequency fr2 may not always be the same. The difference ΔF between the first resonance frequency fr1 and the second resonance frequency fr2 is not always 0. These resonance frequencies are affected by manufacturing variations of the first structure body 60A (sensor element) and the like. Furthermore, these resonance frequencies also change with temperature.

In the embodiment, an operation (for example, a second operation) in which the difference between the first resonance frequency fr1 and the second resonance frequency fr2 (second difference ΔF) becomes small may be performed. At least a portion of the second operation is performed, for example, by one portion of the calculation part 75 of the controller 74 (resonance frequency adjustment part 75b, see FIG. 3). Hereinafter; an example of the operation for reducing the difference in resonance frequencies will be described.

For example, as shown in FIG. 3, in the first structure body 60A, the first counter electrode member 20M may further include a first counter conductive portion 21C and a second counter conductive portion 22C. The first counter conductive portion 21C faces the first movable member 10. The second counter conductive portion 22C faces the first movable member 10. The direction from the first movable member 10 toward the second counter conductive portion 22C crosses the direction from the first movable member 10 to the first counter conductive portion 21C.

As shown in FIG. 3, the first movable member 10 may further include a first conductive portion 11C and a second conductive portion 12C. The first counter conductive portion 21C faces the first conductive portion 11C, The second counter conductive portion 22C faces the second conductive portion 12C. In this example, the group of the first counter conductive portion 21C and the first conductive portion 11C corresponds to a parallel flat plate electrode pair. The group of the second counter conductive portion 22C and the second conductive portion 12C corresponds to a parallel flat plate electrode pair.

For example, the driver part 76 includes a voltage output part Dp1 and a voltage output part Dp2. The voltage output part Dp1 is connected to the first counter conductive portion 21C by, for example, the wiring Lp1. The voltage output part Dp2 is connected to the second counter conductive portion 22C by, for example, the wiring Lp2. The voltage output part Dp1 applies a first counter conductive portion voltage Vp1 to the first counter conductive portion 21C. The voltage output part Dp2 applies a second counter conductive portion voltage Vp2 to the second counter conductive portion 22C.

The resonance frequency of the vibration of the first movable member 10 can be controlled by the first counter conductive portion voltage Vp1 and the second counter conductive portion voltage Vp2. For example, a first variable electric spring is formed by the first conductive portion 11C, the first counter conductive portion 21C, and the first counter conductive portion voltage Vp1. For example, a second variable electric spring is formed by the second conductive portion 12C, the second counter conductive portion 22C, and the second counter conductive portion voltage Vp2. The directions of these variable electric springs cross each other.

For example, the direction of displacement of the first movable member 10 when the first counter conductive portion voltage Vp1 changes crosses the direction of displacement of the first movable member 10 when the second counter conductive portion voltage Vp2 changes. Multiple variable electric springs corresponding to displacements in multiple directions can control the resonance frequency in any direction.

As described above, the acquired first component has the first resonance frequency fr1 and the acquired second component has the second resonance frequency fr2. The controller 74 acquires the first component along the first direction D1 of the vibration amplitude and the second component along the second direction D2 of the vibration amplitude. The controller 74 changes at least one of the first counter conductive portion voltage Vp1 of the first counter conductive portion 21C or the second counter conductive portion voltage Vp2 of the second counter conductive portion 22C so that the absolute value (second absolute value) of the difference (second difference ΔF) between the first resonance frequency fr1 of the acquired first component and the second resonance frequency fr2 of the acquired second component becomes small.

As a result, the difference in the resonance frequency in the in-plane direction (second difference ΔF) can be small. The accuracy can be further improved.

For example, the second difference ΔF may be compared with a defined threshold. When the second difference ΔF is less than the threshold value, the process ends. When the second difference ΔF is not less than the threshold value, the process returns to the above-mentioned acquisition operation and the above-mentioned operation of reducing the second difference ΔF. The controller 74 may repeat such an operation. For example, the operation of reducing the second difference ΔF may be an operation that is always automatic by a closed loop.

In the embodiment, the first acquisition operation and the first operation including the first change operation may be repeatedly performed. For example, the control operation for reducing the first difference ΔT and the control operation for reducing the second difference ΔF may be performed in any order. For example, at least a portion of the control operation for reducing the first difference ΔT or at least a portion of the control operation for reducing the second difference ΔF may be performed at the same time.

In the embodiment, in addition to the processing operation for deriving the second rotation angle θv2 in which the first rotation angle θv1 is corrected based on the resonance frequency fb1 of the second movable member 50, the above-mentioned first operation (control so that at least one of the first absolute value of the first difference ΔT or the second absolute value of the second difference ΔF becomes smaller) is performed, and thereby higher accuracy detection becomes possible.

For example, the vibration of the second movable member 50 may include a component in the third direction (for example, the Z-axis direction) that crosses the first surface 60f.

For example, at least one of the first absolute value of the first difference ΔT or the second absolute value of the second difference ΔF changes depending on the temperature. The resonance frequency fb1 of the second movable member 50 changes according to the temperature. In the embodiment, the controller 74 may correct at least one of the first absolute value or the second absolute value, which changes according to the temperature, based on the resonance frequency fb1 of the vibration of the second movable member 50. The corrected rotation angle may be derived from these corrected values.

Figure 4A:
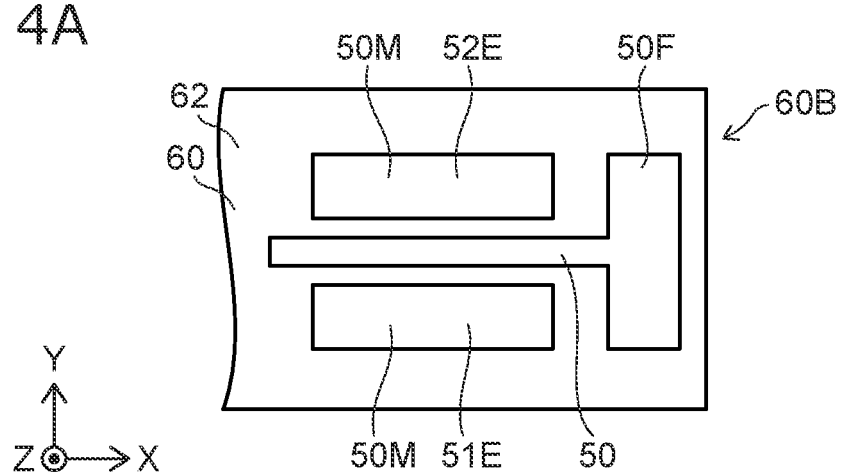
FIGS. 4A to 4C are schematic plan views illustrating a portion of the sensor according to the first embodiment.
Figure 4B:
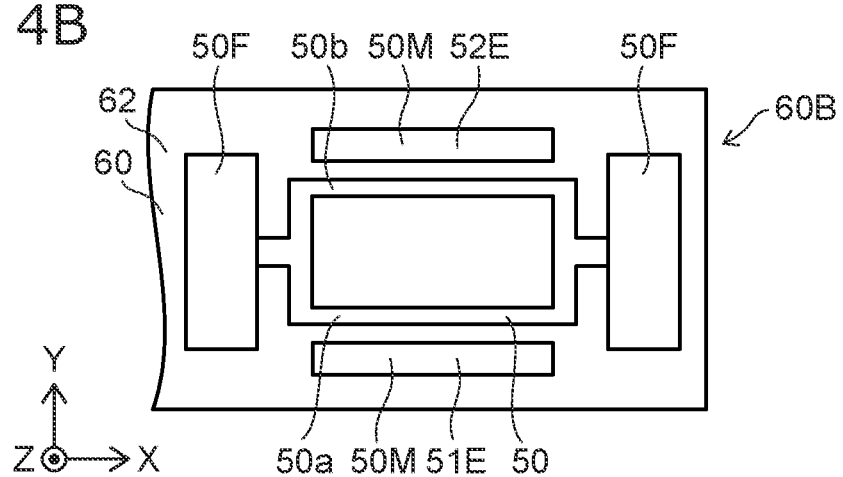
Figure 4C:
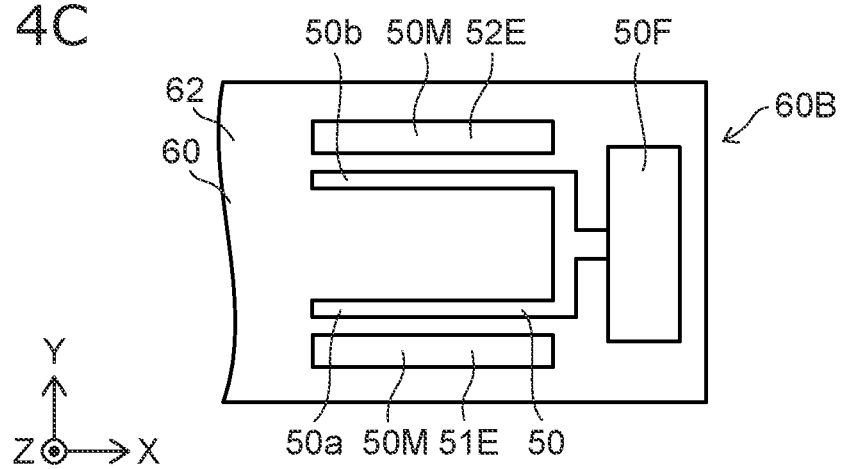

FIGS. 4A to 4C are schematic plan views illustrating a portion of the sensor according to the first embodiment.

These figures illustrate the second structure body 60B. As shown in FIG. 4A, the second structure body 60B includes the second movable member 50, the second fixing portion 50F, and the second counter electrode member 50M. The second fixing portion 50F is fixed to the second base body region 62. The second fixing portion 50F supports the second movable member 50. The second counter electrode member 50M faces the second movable member 50. In this example, the number of the second fixing portions 50F is 1.

As shown in FIG. 4B, the second structure body 60B may include multiple second fixing portions 50F. At least a portion of the second movable member 50 is between the multiple second fixing portions 50F. The direction from one of the multiple second fixing portions 50F toward another one of the multiple second fixing portions 50F crosses the direction from the second counter electrode member 50M toward the second movable member 50.

As shown in FIGS. 4B and 4C, the second movable member 50 may include multiple beams (beams 50a and 50b).

FIGS. 5A, 5B, 6, and 7A to 7C are schematic views illustrating the sensor according to the first embodiment.

Figure 5A:
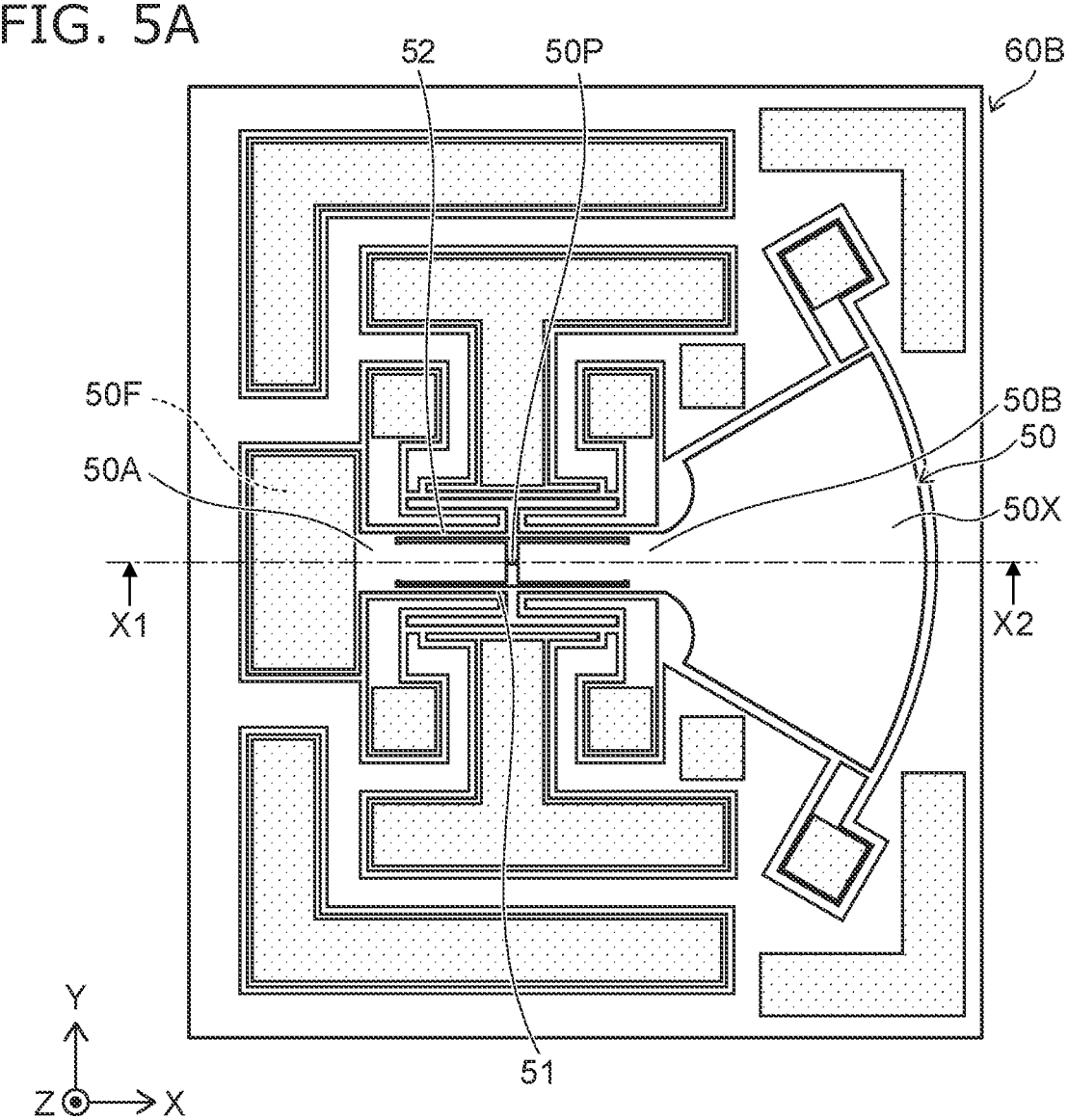
FIGS. 5A and 5B are schematic views illustrating the sensor according to the first embodiment.
Figure 5B:
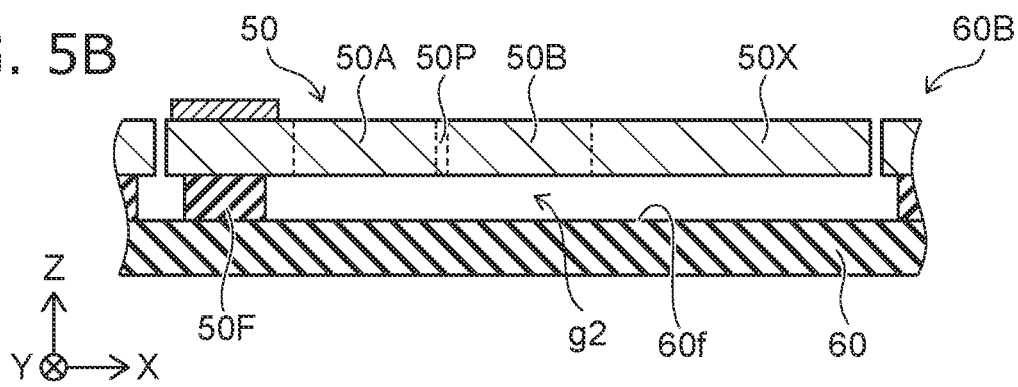
Figure 6:
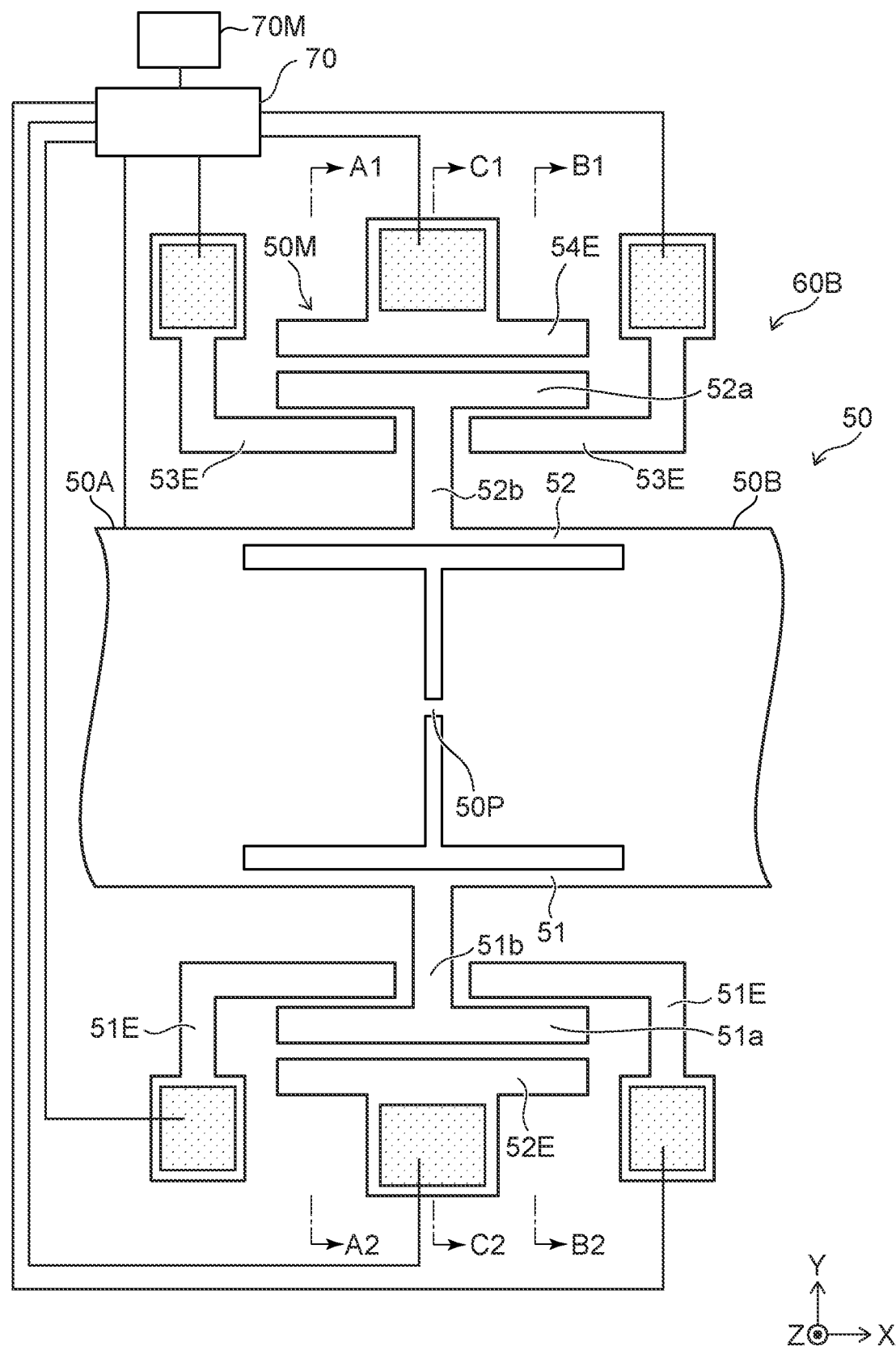
FIG. 6 is a schematic view illustrating the sensor according to the first embodiment.
Figure 7A:
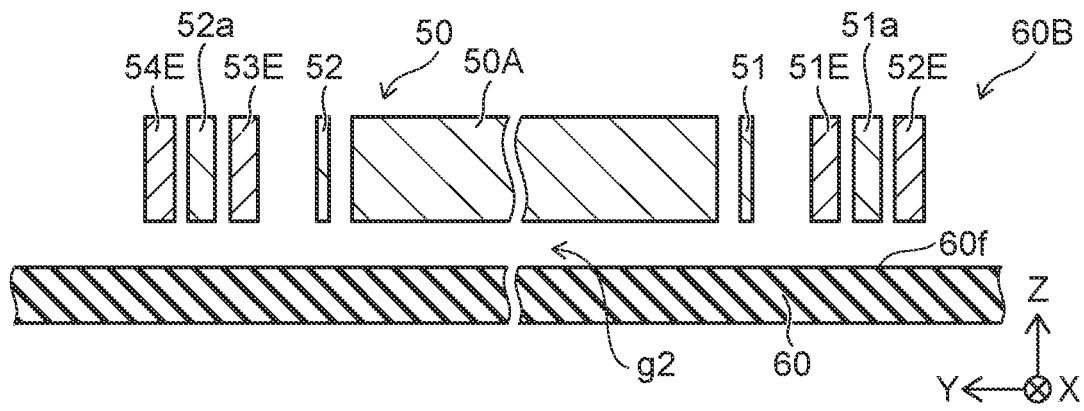
FIGS. 7A to 7C are schematic views illustrating the sensor according to the first embodiment.
Figure 7B:
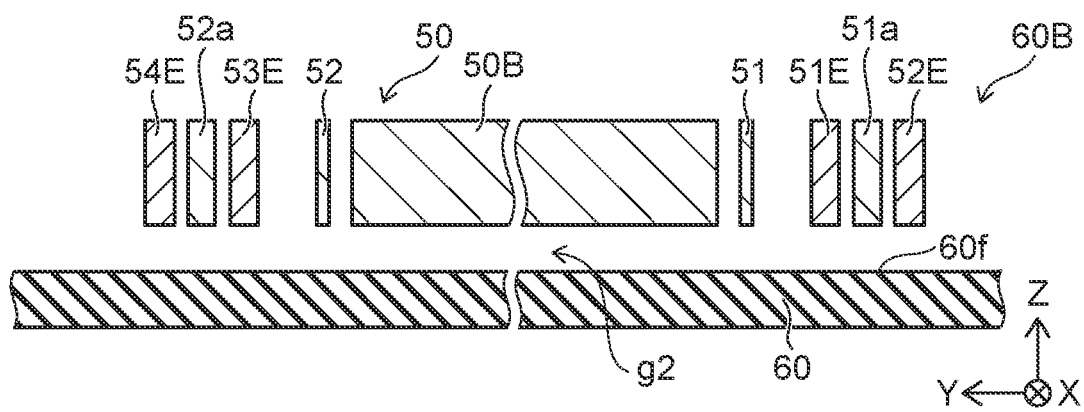
Figure 7C:
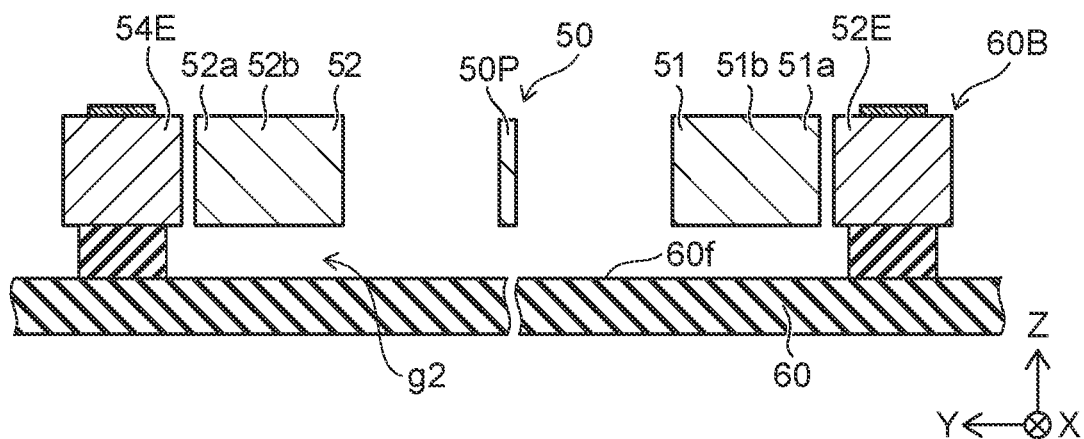

FIG. 5A is a plan view, FIG. 5B is a cross-sectional view taken along line X1-X2 of FIG. 5A. FIG. 6 is a plan view illustrating a portion of the sensor. FIG. 7A is a cross-sectional view taken along line A1-A2 of FIG. 6. FIG. 7B is a cross-sectional view taken along line B1-B2 of FIG. 6, FIG. 7C is a cross-sectional view taken along line C1-C2 of FIG. 6.

As shown in FIGS. 5A and 5B, in the example of the second structure body 60B of the sensor according to the embodiment, the second movable member 50 includes the second fixing portion 50F and a first movable base portion 50A, a first movable connecting portion 50P, a second movable base portion 50B, a first movable beam 51, and a second movable beam 52. The second fixing portion 50F is fixed to the base body 60. The first movable base portion 50A is supported by the second fixing portion 50F. In this example, the first movable base portion 50A is between the second fixing portion 50F and the second movable base portion 50B in the X-axis direction. The first movable connecting portion 50P is between the first movable base portion 50A and the second movable base portion 50B in the X-axis direction, The first movable connecting portion 50P connects the second movable base portion 50B to the first movable base portion 50A.

The length of the first movable connecting portion 50P along the Y-axis direction is shorter than the length of the first movable base portion 50A along the Y-axis direction. The length of the first movable connecting portion 50P along the Y-axis direction is shorter than the length of the second movable base portion 50B along the Y-axis direction.

A portion of the first movable beam 51 is connected to a portion of the first movable base portion 50A. The other portion of the first movable beam 51 is connected to a portion of the second movable base portion 50B. A portion of the second movable beam 52 is connected to the other portion of the first movable base portion 50A. The other portion of the second movable beam 52 is connected to the other portion of the second movable base portion 50B. The first movable connecting portion 50P is between the first movable beam 51 and the second movable beam 52 in the Y-axis direction, A gap g2 is located between the base body 60 and the structure body including the first movable base portion 50A, the first movable connecting portion 50P, the second movable base portion 50B, the first movable beam 51, and the second movable beam 52.

In this example, the second movable member 50 includes a movable portion 50X. The movable portion 50X is connected to the second movable base portion 50B. The second movable base portion 50B and the movable portion 50X is possible to be rotationally displaced in the X-Y plane around the first movable connecting portion 50P. The length of the movable portion 50X along the Y-axis direction is longer than the length of the second movable base portion 50B along the Y-axis direction. The movable portion 50X is a movable mass.

For example, acceleration is applied to the second movable member 50, and the movable portion 50X is displaced. As a result, one stress of compression and tension is applied to the first movable beam 51. The other stress of compression and tension is applied to the second movable beam 52. As a result, at the resonance frequency of the first movable beam 51, one of an increase or a decrease occurs. At the resonance frequency of the second movable beam 52, the other one of an increase or a decrease occurs. The acceleration is possible to be detected from the difference between these resonance frequencies. By providing such two movable beams, the acceleration of rotation about the Z-axis direction can be detected with high sensitivity, For example, in the detection of acceleration, correction may be performed based on the data stored in the storage part 70M (see FIG. 6).

The sum of the resonance frequency of the first movable beam 51 and the resonance frequency of the second movable beam 52 is not affected by the rotation. The sum has temperature dependence. Based on the sum of these resonance frequencies, the first rotation angle θv1 of the first movable member 10 can be corrected to derive the second rotation angle θv2. Even in such a configuration, the accuracy can be improved.

As shown in FIG. 6, in this example, the second movable member 50 includes a movable portion 51a, a movable portion 51b, a movable portion 52a, and a movable portion 52b (see FIGS. 7A to 7C).

In the Y-axis direction, the first movable beam 51 is between the movable portion 51a and the first movable connecting portion 50P. The movable portion 51b is between the movable portion 51a and the first movable beam 51. The movable portion 51b connects the movable portion 51a to the first movable beam 51. The length of the movable portion 51b along the X-axis direction is shorter than the length of the movable portion 51a along the X-axis direction. The length of the movable portion 51b along the X-axis direction is shorter than the length of the first movable beam 51 along the X-axis direction. The movable portion 51a is possible to be displaced according to the displacement of the first movable beam 51.

In the Y-axis direction, a second movable beam 52 is between the movable portion 52a and the first movable connecting portion 50P. The movable portion 52b is between the movable portion 52a and the second movable beam 52. The movable portion 52b connects the movable portion 52a to the second movable beam 52. The length of the movable portion 52b along the X-axis direction is shorter than the length of the movable portion 52a along the X-axis direction. The length of the movable portion 52b along the X-axis direction is shorter than the length of the second movable beam 52 along the X-axis direction. The movable portion 52a is possible to be displaced according to the displacement of the second movable beam 52.

As shown in FIG. 6, in this example, electrodes 51E to 54E are provided as multiple second counter electrode members 50M. With these electrodes, the first movable beam 51 and the second movable beam 52 can be vibrated. With these electrodes, it is possible to detect the resonance frequencies of the first movable beam 51 and the second movable beam 52.

FIGS. 8A, 8B, 9A and 9B are schematic views illustrating the sensor according to the first embodiment.

Figure 8A:
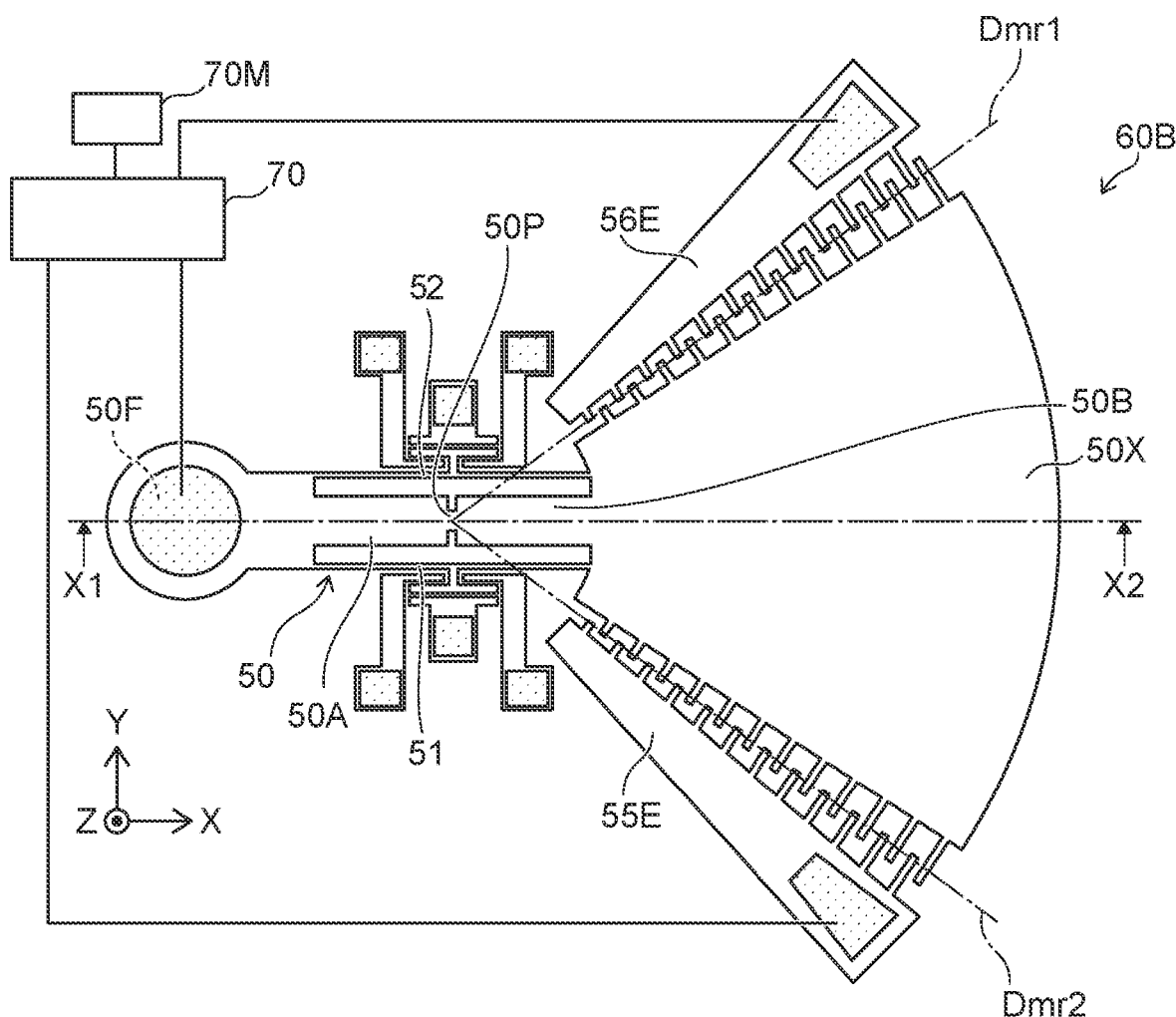
FIGS. 8A and 8B are schematic views illustrating the sensor according to the first embodiment.
Figure 8B:
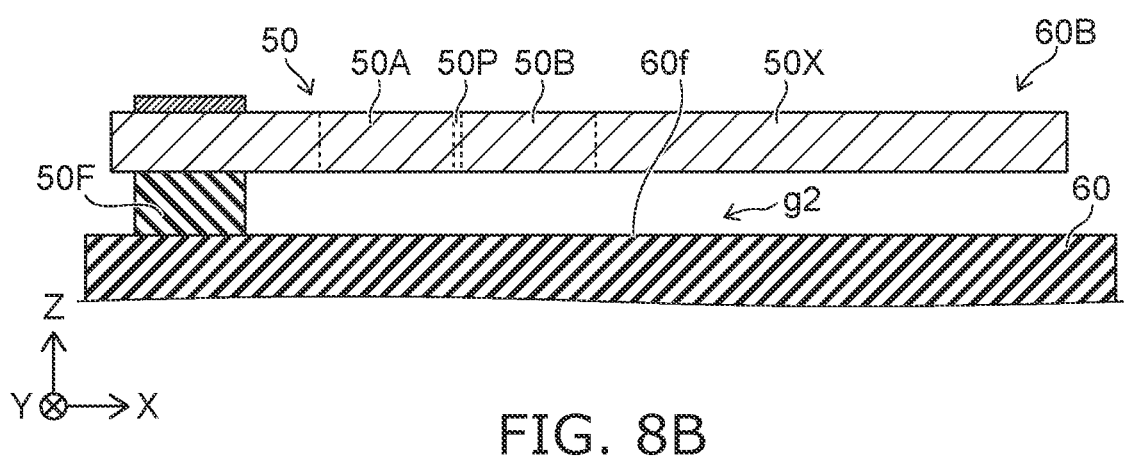
Figure 9A:
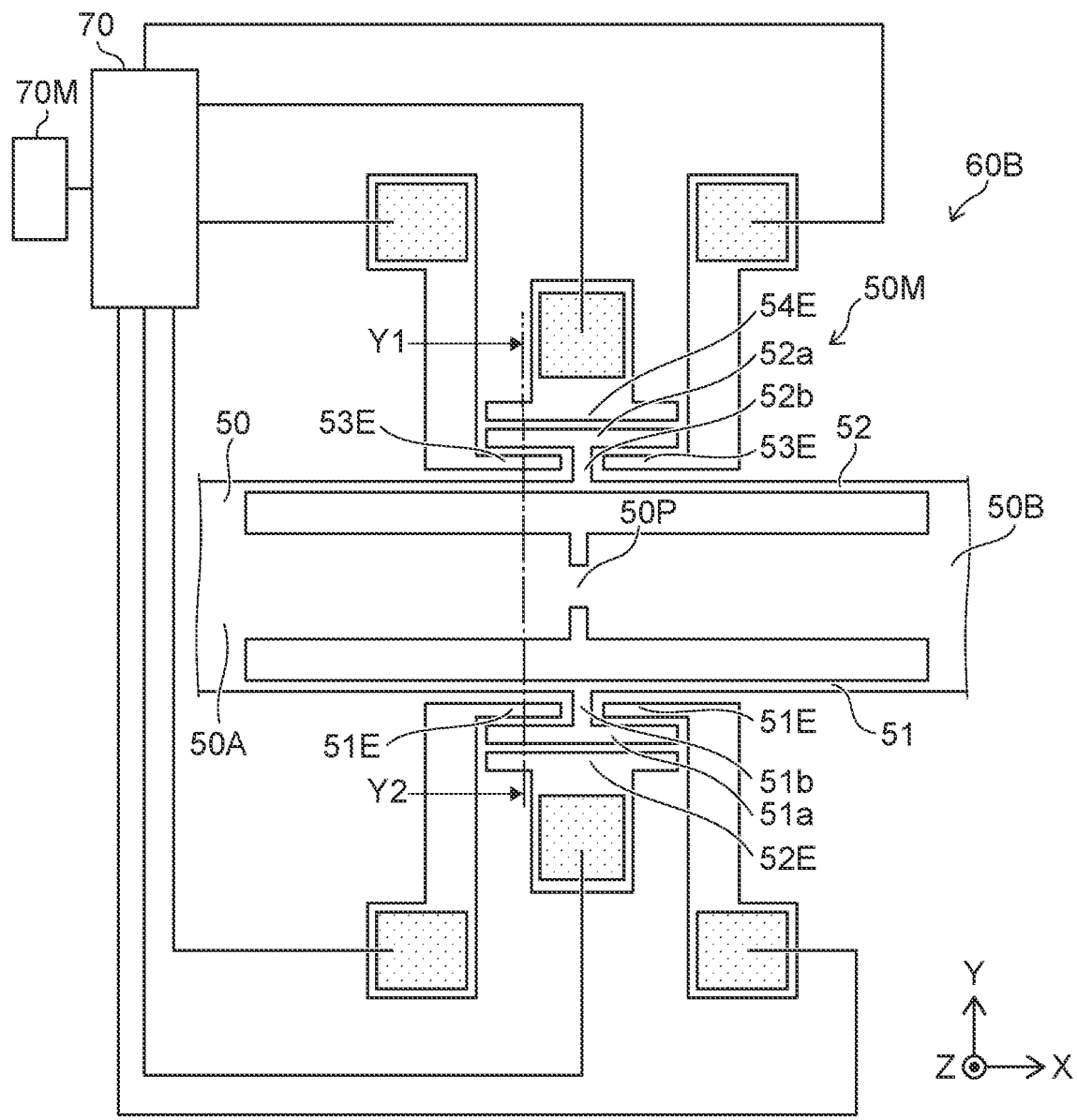
FIGS. 9A and 9B are schematic views illustrating the sensor according to the first embodiment.
Figure 9B:
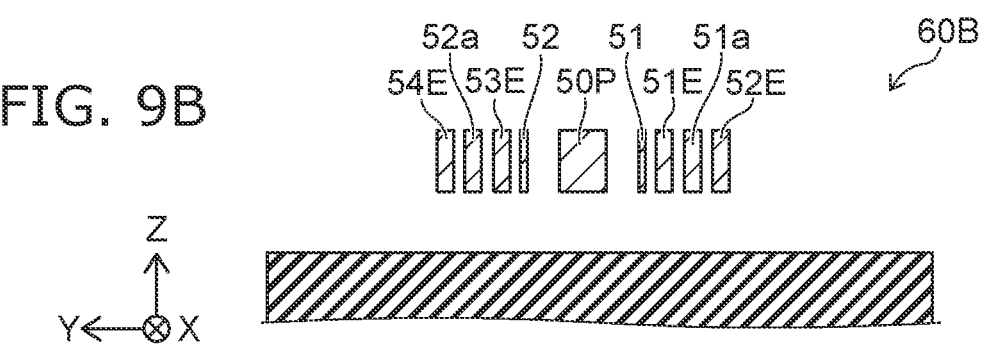

FIG. 8A is a plan view. FIG. 8B is a cross-sectional view taken along line X1-X2 of FIG. 8A. FIG. 9A is a plan view illustrating a portion of the sensor. FIG. 9B is a cross-sectional view taken along line Y1-Y2 of FIG. 9A.

As shown in FIG. 8A, in the second structure body 60B of the sensor according to the embodiment, the second movable member 50 includes the second fixing portion 50F, and the first movable base portion 50A, the first movable connecting portion 50P, the second movable base portion 50B, the first movable beam 51, the second movable beam 52, and the movable portion 50X. In this example, the movable portion 50X includes unevenness protruding in the X-Y plane. In addition to the electrodes 51E to 54E, electrodes 55E and 56E are provided as the multiple second counter electrode members 50M. A portion of the unevenness of the movable portion 50X forms a comb-shaped electrode with the electrode 55E, Another portion of the unevenness of the movable portion 50X forms a comb-shaped electrode with the electrode 56E. A portion of the multiple protrusions provided on the movable portion 50X is arranged along a straight line Dmr1 passing through the first movable connecting portion 50P. Another portion of the multiple protrusions provided on the movable portion 50X is arranged along another straight line Dmr2 passing through the first movable connecting portion 50P. The straight line Dmr1 and the straight line Dmr2 are along the X-Y plane. The straight line Dmr1 and the straight line Dmr2 cross each other. The potentials of the electrodes 55E and 56E are controlled, As a result, the movable portion 50X can be displaced (or vibrated) so as to rotate around the first movable connecting portion 50P. In this example as well, the acceleration can be detected.

Also in this example, based on the sum of the resonance frequency of the first movable beam 51 and the resonance frequency of the second movable beam 52, the first rotation angle θv1 of the first movable member 10 can be corrected to derive the second rotation angle θv2. Even in such a configuration, the accuracy can be improved, In the example of FIGS. 6 and 9A, the control device 70 can separate the dependence of the second movable member 50 on the acceleration of the resonance frequency and the dependence of the second movable member 50 on the temperature of the resonance frequency.

In the embodiment, for example, a movable body (for example, the first movable member 10) which is possible to vibrate in the first direction D1 and the second direction D2 crossing the first direction, and a spring mechanism for vibrating the movable body in theses directions (for example, the first connection portion 10S) are provided. The controller 74 (one detection part) can detect the amplitude of vibration in the second direction of the movable body based on the Coriolis force due to the angle velocity Ω of rotation acting on the movable body vibrating in the first direction D1. The controller 74 (another detection part) can detect the amplitude of vibration in the first direction D1 of the movable body based on the Coriolis force due to the angle velocity Ω of rotation acting on the movable body vibrating in the second direction D2. The controller 74 (rotation angle acquisition part or rotation angle derivation part 75c) acquires the rotation angle of the movable body based on the amplitude of the vibration in the first direction D1 and the amplitude of the vibration in the second direction D2.

The variable electric spring and the variable electric damper are provided. The variable electric spring is formed by, for example, a vibrating body, a parallel plate electrode associated therewith, and a variable voltage applied to the parallel plate electrode. The variable electric damper is formed by a vibrating body, a comb tooth electrode associated therewith, a variable resistor connected to the comb tooth electrode, and a variable voltage applied to the variable resistor. An oscillator arranged in the same chip as the vibrating body and electrodes attached to the oscillator are provided. A resonance frequency acquisition part for acquiring the resonance frequency of the oscillator is provided.

Based on the vibration amplitude detected by the above detection part, the difference (second difference $\Delta F$) between the resonance frequency of the first component in the first direction D1 and the resonance frequency of the second component in the second direction D2 is detected. The controller 74 controls the variable electric spring by a closed loop so as to reduce the second difference $\Delta F$. The control is performed, for example, continuously and automatically. The control may be performed at all times.

Based on the vibration amplitude detected by the detection part, the difference (first difference $\Delta T$) between the attenuation time constant of the first component in the first direction D1 and the attenuation time constant of the second component in the second direction D2 is detected. The controller 74 controls the variable electric damper by a closed loop so as to reduce the first difference $\Delta T$. The control is performed, for example, continuously and automatically. The control may be performed at all times.

For example, the controller 74 is possible to output a corrected rotation angle based on the second difference $\Delta F$, the first difference $\Delta T$, the rotation angle obtained by the rotation angle acquisition part, and the resonance frequency fb1 obtained from the oscillator. The corrected rotation angle is a rotation angle corresponding to the angle velocity $\Omega$ of the rotation applied to the movable body. A more accurate rotation angle can be obtained.

Figure 10A:
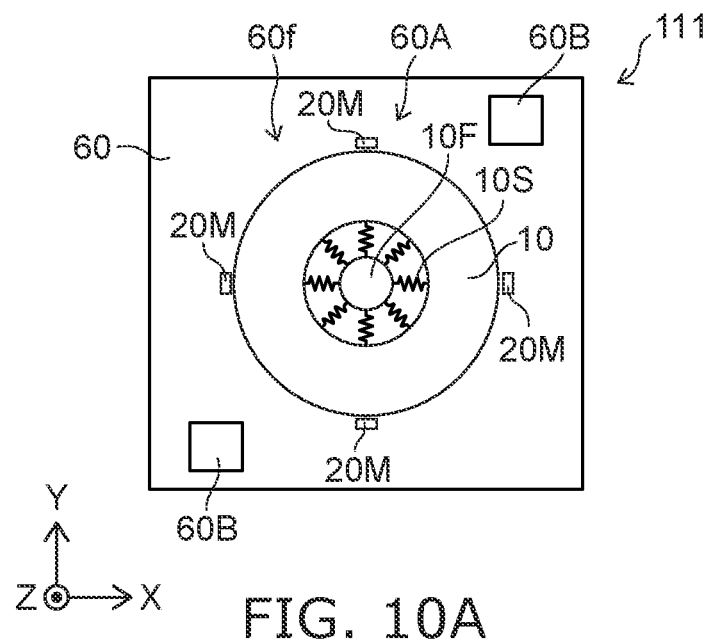
FIGS. 10A and 10B are schematic plan views illustrating a sensor according to the first embodiment.
Figure 10B:
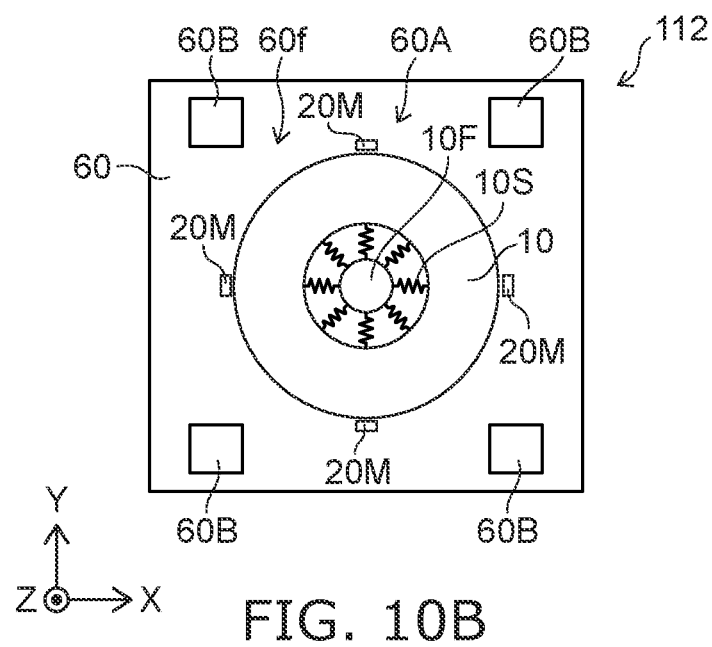

FIGS. 10A and 10B are schematic plan views illustrating a sensor according to the first embodiment.

As shown in FIG. 10A, a sensor 111 according to the embodiment includes multiple second structure bodies 60B. In this example, at least a portion of the first structure body 60A (eg, the first movable member 10) is between the multiple second structure bodies 608.

As shown in FIG. 10B, multiple second structure bodies 60B are also provided in a sensor 112 according to the embodiment. The direction from one of the multiple second structure bodies 60B toward another one of the multiple second structure bodies 60B crosses the direction from still another one of the multiple second structure bodies 60B toward still another one of the multiple second structure bodies 60B. For example, the first structure body 60A is provided at diagonal positions of the four second structure bodies 60B.

The controller 74 is possible to acquire signals (signals Including the resonance frequency fb1) obtained from the multiple second structure bodies 60B and derive the averaged resonance frequency fb1.

For example, at the position of the first structure body 60A, the stress distribution on the base body 60 and the like becomes more uniform. For example, the temperature distribution becomes more uniform. For example, the distribution of wiring for electrical connections in the X-Y plane becomes more uniform. For example, the electrical properties (eg, the effects of noise or coupling) are more uniform. Higher precision correction is possible. Higher accuracy detection is possible.

Figure 11:
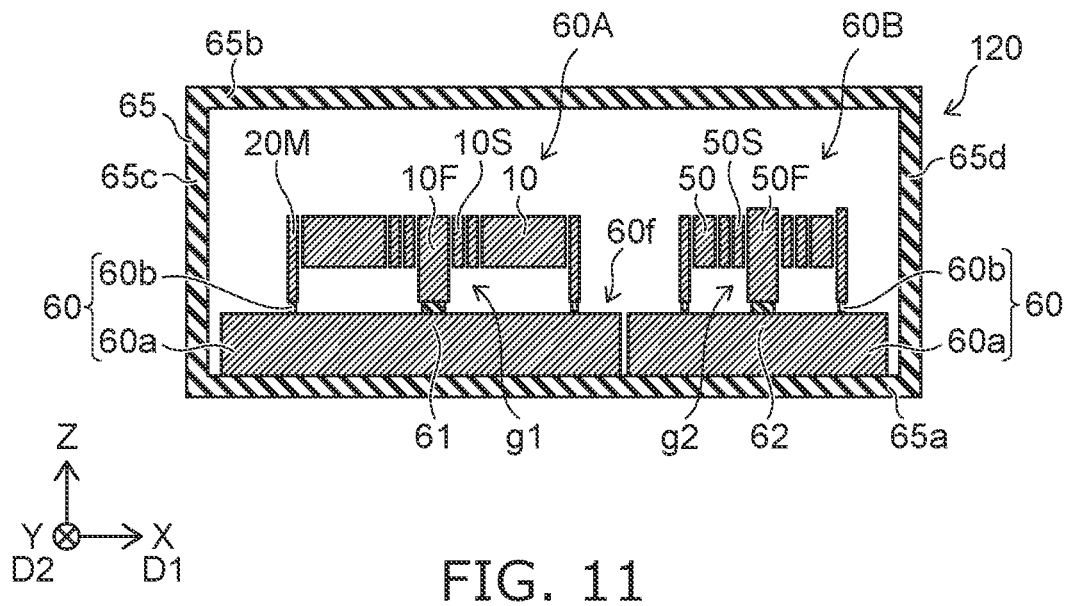
FIG. 11 is a schematic cross-sectional view illustrating a sensor according to the first embodiment.

FIG. 11 is a schematic cross-sectional view illustrating a sensor according to the first embodiment.

As shown in FIG. 11, a sensor 120 according to the embodiment includes the first structure body 60A, the second structure body 60B, the first housing 65, and the control device 70. The first structure body 60A is provided in the first base body region 61 including the first surface 60f. The second structure body 60B is provided in the second base body region 62. The first base body region 61 is included in one base body 60. The second base body region 62 may be included in another base body 60. The first structure body 60A and the second structure body 60B are provided in the first housing 65. The configuration of the sensor 120 other than the above may be the same as that of the sensor 110 and the like.

For example, in the sensor 120, the first structure body 60A includes the first movable member 10 which is possible to vibrate. The vibration of the first movable member 10 includes the first component along the first direction D1 along the first surface 60f, the second component along the second direction D2 crossing the first direction D1 and along the first surface 60f. The second structure body 60B includes the second movable member 50 which is possible to vibrate. The control device 70 includes the controller 74 that is possible to perform a processing operation. The processing operation includes outputting the second rotation angle $\theta v2$ obtained by correcting the first rotation angle $\theta v1$ of the first movable member 10 based on the resonance frequency fb1 of the second movable member 50. The first rotation angle $\theta v1$ of the first movable member 10 is obtained based on the first component and the second component.

In the sensor 120, the first structure body 60A and the second structure body 60B are provided in the first housing 65, so that the temperatures of these structure bodies become substantially the same. Highly accurate correction is possible. In the configuration of the sensor 120, multiple second structure bodies 60B may be provided (see FIGS. 10A and 10B).

Figure 12:
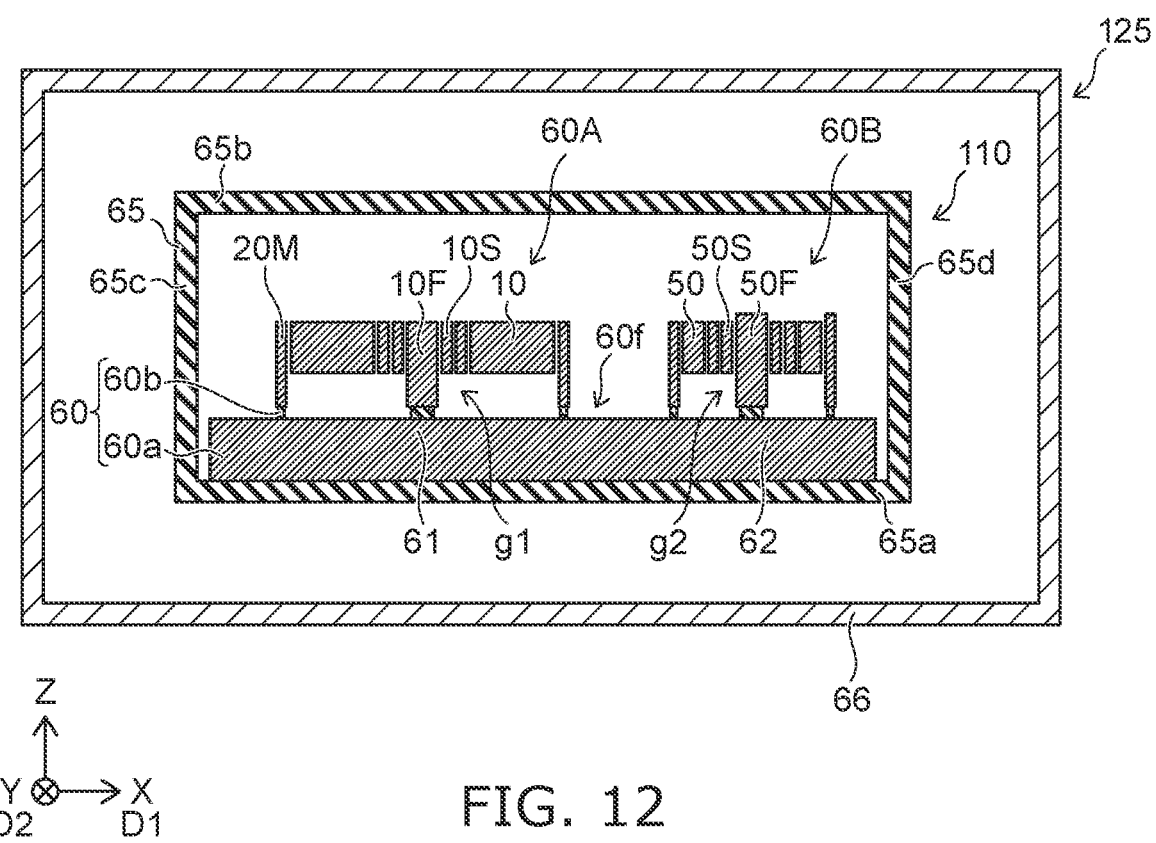
FIG. 12 is a schematic cross-sectional view illustrating a sensor according to the first embodiment.

FIG. 12 is a schematic cross-sectional view illustrating a sensor according to the first embodiment.

As shown in FIG. 12, a sensor 125 according to the embodiment includes a second housing 66. For example, the first housing 65 is provided in the second housing 66. The control device 70 may be provided inside or outside the second housing 66. The second housing 66 may function as, for example, an EMI shield. The second housing 66 may include, for example, a metal material, or a magnetic material or the like, In the example of FIG. 12, the structure illustrated in FIG. 11 may be provided in the second housing 66.

Second Embodiment

The second embodiment relates to an electronic device.

Figure 13:
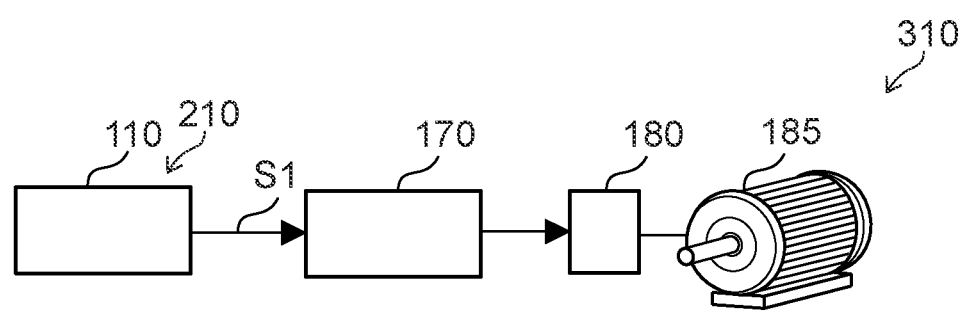
FIG. 13 is a schematic view illustrating an electronic device according to a second embodiment.

FIG. 13 is a schematic view illustrating the electronic device according to the second embodiment.

As shown in FIG. 13, an electronic device 310 according to the embodiment includes the sensor according to the embodiment and a circuit controller 170. In the example of FIG. 13, the sensor 110 (or a sensor device 210) is drawn as a sensor. The circuit controller 170 is possible to control a circuit 180 based on a signal S1 obtained from the sensor. The circuit 180 is, for example, a control circuit or the like of a drive device 185. According to the embodiment, the circuit 180 or the like for controlling the drive device 185 can be controlled with high accuracy based on the detection result with high accuracy.

FIGS. 14A to 14H are schematic views illustrating applications of the electronic device.

Figure 14A:
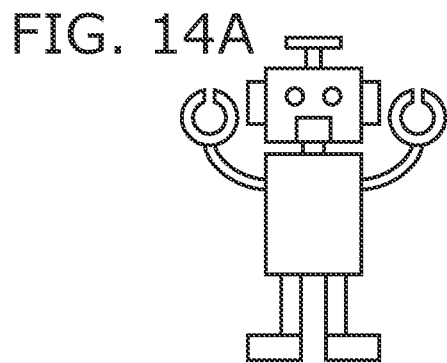
FIGS. 14A to 14H are schematic views illustrating applications of the electronic device.
Figure 14B:
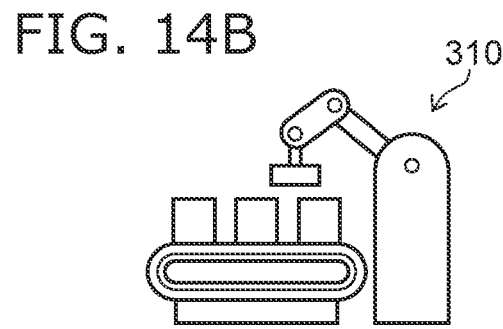
Figure 14C:
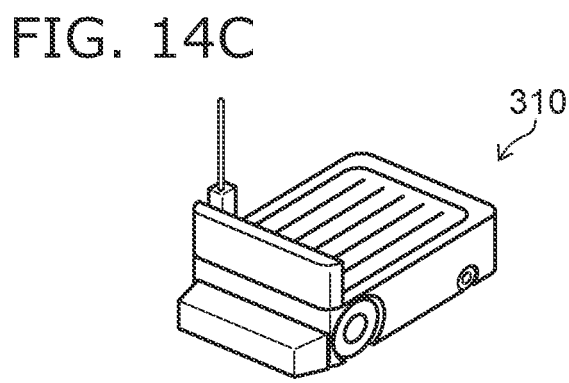
Figure 14D:
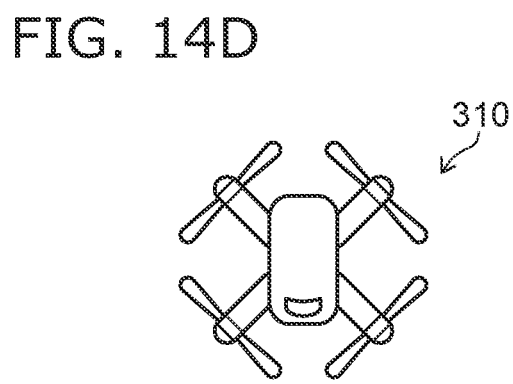
Figure 14E:
Figure 14F:
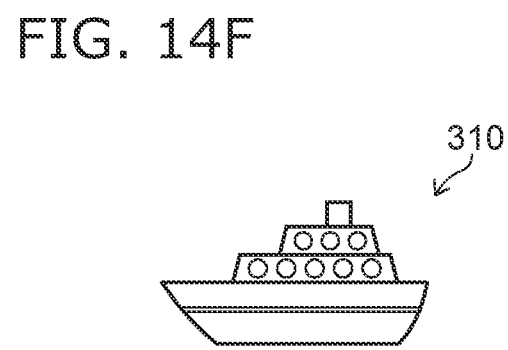
Figure 14G:
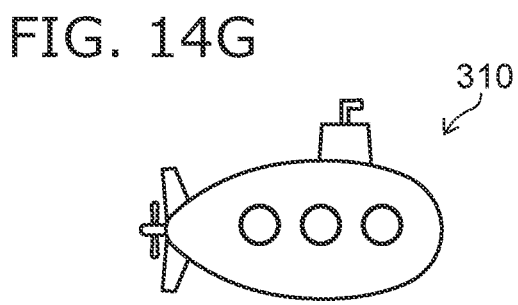
Figure 14H:
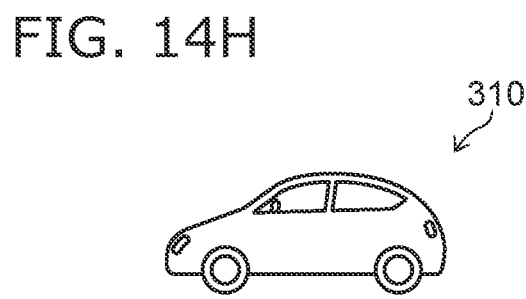

As shown in FIG. 14A, the electronic device 310 may be at least a portion of a robot. As shown in FIG. 14B, the electronic device 310 may be at least a portion of a work robot provided in a manufacturing factory or the like. As shown in FIG. 14C, the electronic device 310 may be at least a portion of an automated guided vehicle such as in a factory. As shown in FIG. 14D, the electronic device 310 may be at least a portion of a drone (unmanned aerial vehicle). As shown in FIG. 14E, the electronic device 310 may be at least a portion of an airplane. As shown in FIG. 14F, the electronic device 310 may be at least a portion of a ship. As shown in FIG. 14G, the electronic device 310 may be at least a portion of a submarine. As shown in FIG. 14H, the electronic device 310 may be at least a portion of an automobile, The electronic device 310 may include, for example, at least one of a robot or a mobile body.

The embodiment may include the following configurations (eg, technical proposals).

Configuration 1

A sensor, comprising:
a base body including a first surface including a first base body region and a second base body region;
a first structure body provided in the first base body region;
a second structure body provided in the second base body region; and
a control device,
the first structure body including a first movable member configured to vibrate, the vibration of the first movable member including a first component along a first direction along the first surface and a second component along a second direction along the first surface, the second direction crossing the first direction,
the second structure body including a second movable member configured to vibrate,
the control device including a controller configured to perform a processing operation, and
the processing operation including outputting a second rotation angle, the second rotation angle being obtained by correcting a first rotation angle based on a resonance frequency of the second movable member, the first rotation angle of the first movable member being obtained based on the first component and the second component.

Configuration 2

The sensor according to Configuration 1, wherein
The second base body region is continuous with the first base body region.

Configuration 3

The sensor according to Configuration 1 or 2, further comprising: a first housing,
the first structure body and the second structure body are provided in the first housing.

Configuration 4

A sensor, comprising:
a first structure body provided in a first base body region including a first surface;
a second structure body provided in a second base body region;
a first housing; and
a control device,
the first structure body and the second structure body being provided in the first housing,
the first structure body including a first movable member configured to vibrate, the vibration of the first movable member including a first component along a first direction along the first surface and a second component along a second direction along the first surface, the second direction crossing the first direction,
the second structure body including a second movable member configured to vibrate,
the control device including a controller configured to perform a processing operation, and
the processing operation including outputting a second rotation angle, the second rotation angle being obtained by correcting a first rotation angle based on a resonance frequency of the second movable member, the first rotation angle of the first movable member being obtained based on the first component and the second component.

Configuration 5

The sensor according to any one of Configurations 1 to 4, wherein
the resonance frequency of the second movable member does not change with respect to rotation of the base body around an axis of a third direction that crosses the first surface, alternatively a rate of change of the resonance frequency of the second movable member with respect to the rotation of the base body about the axis of the third direction is not more than a rate of change of the resonance frequency of the second movable member with respect to displacement of the base body along the third direction.

Configuration 6

The sensor according to any one of Configurations 1 to 5, wherein
the first rotation angle changes depending on a temperature of the first movable member; and
the resonance frequency of the second movable member changes depending on a temperature of the second movable member.

Configuration 7

The sensor according to any one of Configurations 1 to 5, wherein
a ratio of absolute value of a difference between a temperature of the second base structure body and a temperature of the first structure body to the temperature of the first structure body is not more than 0.05.

Configuration 8

The sensor according to any one of Configurations 1 to 7, wherein
the first structure body includes
a first fixing portion fixed to the first base body region, and
a first connecting portion supported by the first fixing portion and connected to the first movable member,
the second structure body includes a second fixing portion fixed to the second base body region,
the second fixing portion supports the second movable member, and
the second movable member includes a same material as a material included in the first connecting portion.

Configuration 9

The sensor according to any one of Configurations 1 to 7, wherein
the second base structure body includes
a second fixing portion fixed to the second base body region, and
a second counter electrode member,
the second fixing portion supports the second movable member, and
the second counter electrode member faces the second movable member.

Configuration 10
The sensor according to Configuration 9, wherein
the structure body includes a plurality of second fixing portions,
at least a portion of the second movable member is between the plurality of second fixing portions, and
a direction from one of the plurality of fixing portions toward an other one of the plurality of second fixing portions crosses a direction from the second counter electrode member toward the second movable member.

Configuration 11
The sensor according to Configuration 10, wherein
the second structure body includes a plurality of second counter electrode members,
at least a portion of the second movable member is between the plurality of second counter electrode members, and
the direction from the one of the plurality of fixing portions toward the other one of the plurality of second fixing portions crosses a direction from one of the plurality of second counter electrode member toward the other one of the plurality of second counter electrode members.

Configuration 12
The sensor according to ant one of Configurations 8 to 11, wherein
the second movable member includes a plurality of beams, Configuration 13
The sensor according to ant one of Configurations 8 to 11, wherein
the second movable member includes a first movable beam and a second movable beam, and
the resonance frequency of the second movable member includes a sum of a resonance frequency of the first movable beam and a resonance frequency of the second movable beam.

Configuration 14
The sensor according to Configuration 13, wherein
the second movable member further include a first movable base portion, a first movable connecting portion, and a second movable base portion,
the first movable base portion is supported by the second fixing portion,
the first movable base portion is between the second fixing portion and the second movable base portion,
the first movable connecting portion is between the first movable base portion and the second movable base portion,
the first movable connecting portion connects the second movable base portion to the first movable base portion,
a portion of the first movable beam is connected to a portion of the first movable base portion,
an other portion of the first movable beam is connected to a portion of the second movable base portion,
a portion of the second movable beam is connected to an other of the first movable base portion,
an other of the second movable beam is connected to an other of the second movable base portion, and
the first movable connecting portion is between the first movable beam and the second movable beam.

Configuration 15
The sensor according to Configuration 1, wherein the first structure body includes
a first counter electrode member facing the first movable member, and
a resistor member electrically connected to the first counter electrode member,
the controller is configured to perform a first operation,
the first operation includes
a first acquisition operation acquiring the first component and the second component, and
a first change operation changing at least one value of a resistance of the resistor member or a voltage applied to the resistor member so as to reduce at least one of a first absolute vale of a first difference or a second absolute value of a second difference, the first difference being between a first time constant of the acquired first component and a second time constant of the acquired second component, the second difference being between a first resonance frequency of the acquired first component and a second frequency of the acquired second component.

Configuration 16
The sensor according to Configuration 1, wherein
at least any one of the first absolute value or the second absolute value changes depending on a temperature,
the resonance frequency of the second movable member changes depending on the temperature, and
the controller corrects the at least any one of the first absolute value or the second absolute value changing depending on the temperature.

Configuration 17
The sensor according to Configuration 15, wherein
the first counter electrode member includes
a first counter electrode facing the first movable member, and
a second counter electrode facing the first movable member,
a direction from the first movable member toward the second counter electrode crosses a direction from the first movable member toward the first counter electrode,
the resistor member includes
a first resistor including a first end portion and a first other end portion, the first other end portion being electrically connected to the first counter electrode, and
a second resistor including a second end portion and a second other end portion, the other second end portion being electrically connected to the second counter electrode, and
the controller changes at least one value of a resistance value of the first resistor, a resistance value of the second resistor, a first voltage of the first end portion, or a second voltage of the second end portion in the first change operation so as to reduce the first absolute value, Configuration 18
The sensor according to Configuration 17, wherein
a direction of displacement of the movable member when the first voltage changes crosses a direction of displacement of the movable member when the second voltage changes.

Configuration 19
The sensor according to Configuration 15, wherein
the first counter electrode member includes
a first counter conductive portion facing the first movable member, and
a second counter conductive portion facing the first movable member, a direction from the first movable member toward the second counter conductive portion crosses a direction from the first movable member toward the first counter conductive member, and the controller changes at least any one of a first counter conductive portion voltage of the first counter conductive portion or a second counter conductive portion voltage of the second counter conductive portion in the first change operation so as to reduce the second absolute value.

Configuration 20

An electronic device, comprising:
the sensor according to any one of Configurations 1 to 19; and
a circuit controller configured to control a circuit based on a signal obtained from the sensor, According to the embodiment, a sensor which can improve accuracy can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as structure bodies, movable members, electrodes, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a base body including a first surface including a first base body region and a second base body region;
a first structure body provided in the first base body region;
a second structure body provided in the second base body region; and
a control device,
the first structure body including a first movable member configured to vibrate, the vibration of the first movable member including a first component along a first direction along the first surface and a second component along a second direction along the first surface, the second direction crossing the first direction,
the second structure body including a second movable member configured to vibrate,
the control device including a controller configured to perform a processing operation, and
the processing operation including outputting a second rotation angle, the second rotation angle being obtained by correcting a first rotation angle based on a resonance frequency of the second movable member, the first rotation angle of the first movable member being obtained based on the first component and the second component.

2. The sensor according to claim 1, wherein
the second base body region is continuous with the first base body region.

3. The sensor according to claim 1, further comprising: a first housing,
the first structure body and the second structure body are provided in the first housing.

4. A sensor, comprising:
a first structure body provided in a first base body region including a first surface;
a second structure body provided in a second base body region;
a first housing; and
a control device,
the first structure body and the second structure body being provided in the first housing,
the first structure body including a first movable member configured to vibrate, the vibration of the first movable member including a first component along a first direction along the first surface and a second component along a second direction along the first surface, the second direction crossing the first direction,
the second structure body including a second movable member configured to vibrate,
the control device including a controller configured to perform a processing operation, and
the processing operation including outputting a second rotation angle, the second rotation angle being obtained by correcting a first rotation angle based on a resonance frequency of the second movable member, the first rotation angle of the first movable member being obtained based on the first component and the second component.

5. The sensor according to claim 1, wherein
the resonance frequency of the second movable member does not change with respect to rotation of the base body around an axis of a third direction that crosses the first surface, alternatively a rate of change of the resonance frequency of the second movable member with respect to the rotation of the base body about the axis of the third direction is not more than a rate of change of the resonance frequency of the second movable member with respect to displacement of the base body along the third direction.

6. The sensor according to claim 1, wherein
the first rotation angle changes depending on a temperature of the first movable member, and
the resonance frequency of the second movable member changes depending on a temperature of the second movable member.

7. The sensor according to claim 1, wherein
a ratio of absolute value of a difference between a temperature of the second base structure body and a temperature of the first structure body to the temperature of the first structure body is not more than 0.05.

8. The sensor according to claim 1, wherein
the first structure body includes
a first fixing portion fixed to the first base body region, and
a first connecting portion supported by the first fixing portion and connected to the first movable member,
the second structure body includes a second fixing portion fixed to the second base body region,
the second fixing portion supports the second movable member, and
the second movable member includes a same material as a material included in the first connecting portion.

9. The sensor according to claim 1, wherein
the second base structure body includes
a second fixing portion fixed to the second base body region, and
a second counter electrode member,
the second fixing portion supports the second movable member, and
the second counter electrode member faces the second movable member.

10. The sensor according to claim 9, wherein
the structure body includes a plurality of the second fixing portions,
at least a portion of the second movable member is between the plurality of second fixing portions, and
a direction from one of the plurality of fixing portions toward an other one of the plurality of second fixing portions crosses a direction from the second counter electrode member toward the second movable member.

11. The sensor according to claim 10, wherein
the second structure body includes a plurality of the second counter electrode members,
at least a portion of the second movable member is between the plurality of second counter electrode members, and
the direction from the one of the plurality of fixing portions toward the other one of the plurality of second fixing portions crosses a direction from one of the plurality of second counter electrode member toward the other one of the plurality of second counter electrode members.

12. The sensor according to claim 8, wherein
the second movable member includes a plurality of beams.

13. The sensor according to claim 8, wherein
the second movable member includes a first movable beam and a second movable beam, and
the resonance frequency of the second movable member includes a sum of a resonance frequency of the first movable beam and a resonance frequency of the second movable beam.

14. The sensor according to claim 13, herein
the second movable member further include a first movable base portion, a first movable connecting portion, and a second movable base portion,
the first movable base portion is supported by the second fixing portion,
the first movable base portion is between the second fixing portion and the second movable base portion,
the first movable connecting portion is between the first movable base portion and the second movable base portion,
the first movable connecting portion connects the second movable base portion to the first movable base portion,
a portion of the first movable beam is connected to a portion of the first movable base portion,
an other portion of the first movable beam is connected to a portion of the second movable base portion,
a portion of the second movable beam is connected to an other of the first movable base portion,
an other of the second movable beam is connected to an other of the second movable base portion, and
the first movable connecting portion is between the first movable beam and the second movable beam.

15. The sensor according to claim 1, wherein
the first structure body includes
a first counter electrode member facing the first movable member, and
a resistor member electrically connected to the first counter electrode member,
the controller is configured to perform a first operation,
the first operation includes
a first acquisition operation acquiring the first component and the second component, and
a first change operation to change at least one value of a resistance of the resistor member or a voltage applied to the resistor member so as to reduce at least one of a first absolute vale of a first difference or a second absolute value of a second difference, the first difference being between a first time constant of the acquired first component and a second time constant of the acquired second component, the second difference being between a first resonance frequency of the acquired first component and a second frequency of the acquired second component.

16. The sensor according to claim 15, wherein
at least any one of the first absolute value or the second absolute value changes depending on a temperature,
the resonance frequency of the second movable member changes depending on the temperature, and
the controller corrects the at least any one of the first absolute value or the second absolute value changing depending on the temperature.

17. The sensor according to claim 15, wherein
the first counter electrode member includes
a first counter electrode facing the first movable member, and
a second counter electrode facing the first movable member,
a direction from the first movable member toward the second counter electrode crosses a direction from the first movable member toward the first counter electrode,
the resistor member includes
a first resistor including a first end portion and a first other end portion, the first other end portion being electrically connected to the first counter electrode, and
a second resistor including a second end portion and a second other end portion, the other second end portion being electrically connected to the second counter electrode, and
the controller changes at least one value of a resistance value of the first resistor, a resistance value of the second resistor, a first voltage of the first end portion, or a second voltage of the second end portion in the first change operation so as to reduce the first absolute value.

18. The sensor according to claim 17, wherein
a direction of displacement of the movable member when the first voltage changes crosses a direction of displacement of the movable member when the second voltage changes.

19. The sensor according to claim 15, wherein
the first counter electrode member includes
  a first counter conductive portion facing the first movable member, and
  a second counter conductive portion facing the first movable member,
a direction from the first movable member toward the second counter conductive portion crosses a direction from the first movable member toward the first counter conductive member, and
the controller changes at least any one of a first counter conductive portion voltage of the first counter conductive portion or a second counter conductive portion voltage of the second counter conductive portion in the first change operation so as to reduce the second absolute value.

20. An electronic device, comprising:
the sensor according to claim 1; and
a circuit controller configured to control a circuit based on a signal obtained from the sensor.

\* \* \* \* \*

UNITED STATES PATENT AND TRADEMARK OFFICE
CERTIFICATE OF CORRECTION

| | |
|---|---|
| PATENT NO. | : 11,796,319 B2 |
| APPLICATION NO. | : 17/650749 |
| DATED | : October 24, 2023 |
| INVENTOR(S) | : Fumito Miyazaki et al. |

It is certified that error appears in the above-identified patent and that said Letters Patent is hereby corrected as shown below:

On the Title Page

Item (57), Line 12 of ABSTRACT, "a second rotation angle, The" should read --a second rotation angle. The--.

In the Claims

Claim 14, Column 27, Line 60, "The sensor according to claim 13, herein" should read --The sensor according to claim 13, wherein--.

Claim 15, Column 28, Line 30, "a first absolute vale" should read --a first absolute value--.

Signed and Sealed this
Fifteenth Day of October, 2024

*Katherine Kelly Vidal*
Katherine Kelly Vidal
*Director of the United States Patent and Trademark Office*